(12) United States Patent
Inoue

(10) Patent No.: US 11,079,783 B2
(45) Date of Patent: Aug. 3, 2021

(54) POWER SUPPLY CIRCUIT AND POWER SUPPLY DEVICE

(71) Applicant: Rohm Co., Ltd., Kyoto (JP)

(72) Inventor: Hiroki Inoue, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/800,271

(22) Filed: Feb. 25, 2020

(65) Prior Publication Data

US 2020/0272186 A1   Aug. 27, 2020

(30) Foreign Application Priority Data

Feb. 27, 2019   (JP) .............................. JP2019-034716
Jun. 6, 2019    (JP) .............................. JP2019-106112

(51) Int. Cl.
| | |
|---|---|
| *G05F 1/10* | (2006.01) |
| *G05F 1/46* | (2006.01) |
| *G05F 1/565* | (2006.01) |
| *G05F 1/575* | (2006.01) |
| *B60R 16/033* | (2006.01) |

(52) U.S. Cl.
CPC ............ *G05F 1/575* (2013.01); *B60R 16/033* (2013.01)

(58) Field of Classification Search
None
See application file for complete search history.

(56) References Cited

U.S. PATENT DOCUMENTS

| | | | |
|---|---|---|---|
| 6,765,374 B1 * | 7/2004 | Yang ....................... | G05F 1/575 323/280 |
| 7,733,180 B1 * | 6/2010 | Tadeparthy ............. | H03F 3/505 330/260 |

FOREIGN PATENT DOCUMENTS

JP   2015-201170   11/2015

* cited by examiner

*Primary Examiner* — Kenneth B Wells
(74) *Attorney, Agent, or Firm* — Fish & Richardson P.C.

(57) ABSTRACT

A power supply circuit according to the present invention includes, for example, an output circuit arranged to generate a stabilized voltage from an input voltage using an output transistor, a filter circuit arranged to smooth the stabilized voltage using a resistor and a capacitor so as to generate an output voltage, and a charging circuit arranged to supply charging current to the capacitor without the charging current being passed through the resistor.

21 Claims, 20 Drawing Sheets

* Vtg = 2.8V and Vth[M1] = Vth[M2] = -0.7V are supposed

* Vtg = 2.8V and Vth[M1] = Vth[M2] = -0.7V are supposed

POWER SUPPLY CIRCUIT AND POWER SUPPLY DEVICE

CROSS-REFERENCE TO RELATED APPLICATIONS

This nonprofessional application claims priority under 35 U.S.C. § 119(a) on Patent Application Nos. 2019-034716 filed in Japan on Feb. 27, 2019 and 2019-106112 filed in Japan on Jun. 6, 2019, the entire contents of which are hereby incorporated by reference.

BACKGROUND OF THE INVENTION

Field of the Invention

The invention disclosed in this specification relates to a power supply circuit and a power supply device.

Description of Related Art

A power supply circuit that can generate a desired output voltage from an input voltage is used in various applications (such as in-vehicle equipment, industrial equipment, business equipment, digital home appliances, and portable equipment).

As one example of conventional techniques related to the above, there is Patent Document 1 (JP-A-2015-201170).

As a conventional method for enhancing ripple rejection characteristic of a power supply circuit (i.e. characteristics of rejecting micro noise (nV to μV order) superimposed on the output voltage due to operation of the power supply circuit), it is common to increase drive current of the power supply circuit so as to enhance characteristics of the power supply circuit itself, or to smooth the output voltage using an RC filter.

However, in an application in which lower current consumption is required, for example, it is difficult to adopt the former conventional method. On the other hand, in the latter conventional method, rising of the output voltage is slow, and hence a start sequence of the system may be affected. In particular, if a high resistance resistor is used for the RC filter, the ripple rejection characteristic can be improved from a low frequency band, but start delay of the power supply circuit becomes conspicuous. In addition, only a high impedance node (such as a gate of a transistor) can be connected to the following stage of the power supply circuit, and hence current capacity is limited.

SUMMARY OF THE INVENTION

In view of the above-mentioned problem found by the inventor of this application, it is an object of the invention disclosed in this specification to provide a power supply circuit that can enhance ripple rejection characteristic without causing start delay.

Accordingly, a power supply circuit disclosed in this specification includes, for example, an output circuit arranged to generate a stabilized voltage from an input voltage using an output transistor, a filter circuit arranged to smooth the stabilized voltage using a resistor and a capacitor so as to generate an output voltage, and a charging circuit arranged to supply charging current to the capacitor without the charging current being passed through the resistor.

Further, a power supply circuit disclosed in this specification, which is a power supply circuit that generates a stabilized voltage from an input voltage, for example, includes an output transistor having a first electrode receiving the input voltage, a second electrode, and a control electrode; a first node connected to the second electrode of the output transistor directly or via an inserted resistor; a control circuit arranged to supply a control voltage based on a feedback voltage corresponding to a voltage at the first node to the control electrode of the output transistor so as to control a state of the output transistor; a filter circuit having a filter resistor and a filter capacitor, arranged to smooth the voltage at the first node so as to generate the stabilized voltage at a second node; and a charging transistor disposed between the first node and the second node, a state of the charging transistor being controlled on the basis of the control voltage. When the charging transistor is turned on, the filter capacitor is charged through the charging transistor.

Further, for example, a power supply circuit disclosed in this specification, which is a power supply circuit that generates a stabilized voltage from an input voltage, includes an output transistor having a first electrode receiving the input voltage, a second electrode, and a control electrode; a first node connected to the second electrode of the output transistor via an inserted resistor; a control circuit arranged to supply a control voltage based on a feedback voltage corresponding to a voltage at the first node to the control electrode of the output transistor so as to control a state of the output transistor; a filter circuit having a filter resistor and a filter capacitor, arranged to smooth the voltage at the first node so as to generate the stabilized voltage at a second node; and a charging transistor disposed between the first node and the second node, a state of the charging transistor being controlled on the basis of a voltage drop at the inserted resistor. When the charging transistor is on state, the filter capacitor is charged through the charging transistor.

Note that other features, elements, steps, advantages, and characteristics of the present invention will become more apparent from the description of the best mode embodiment given below and the related attached drawings.

DETAILED DESCRIPTION OF THE PREFERRED EMBODIMENTS

Power Supply Circuit (Comparative Example)

Before describing a novel embodiment of a power supply circuit, a comparative example to be compared with the same is briefly described.

Figure 1:
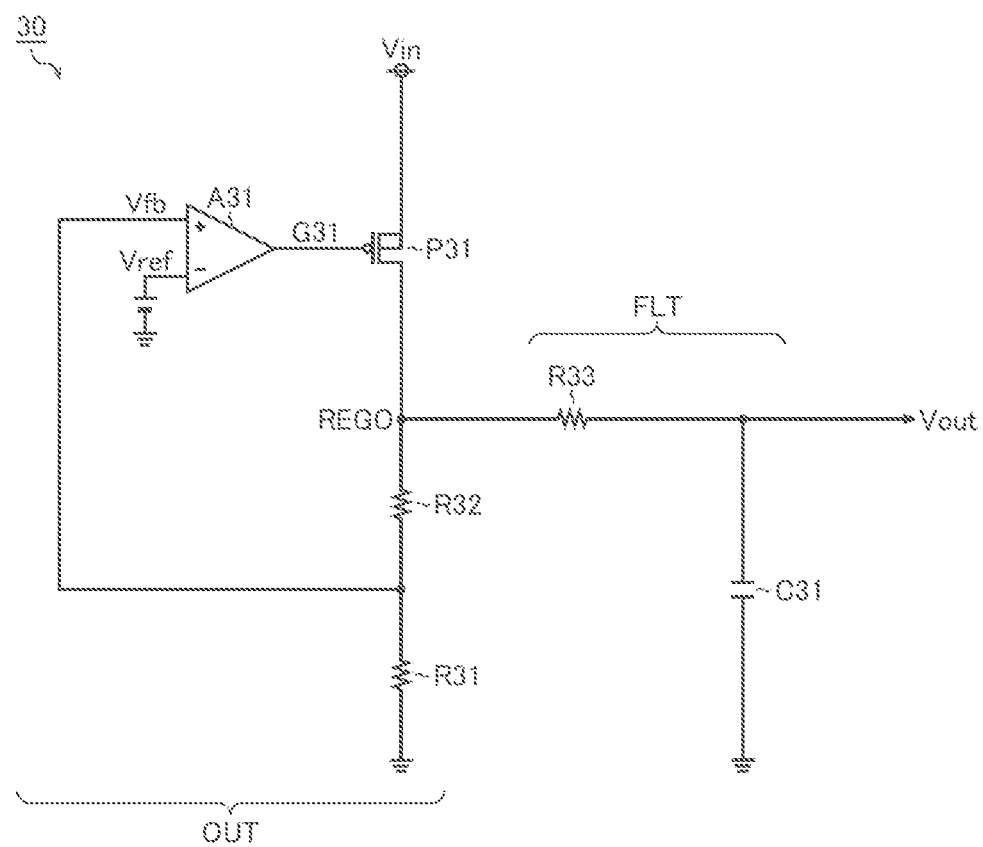
FIG. 1 is a diagram illustrating a comparative example of a power supply circuit.

FIG. 1 is a diagram illustrating the comparative example of the power supply circuit. A power supply circuit 30 of this comparative example, which is a linear power supply that generates an output voltage Vout by stepping down an input voltage Vin, includes a P-channel type MOS field effect transistor P31 (i.e. an output transistor), an operational amplifier A31, resistors R31 to R33, and a capacitor C31.

A source and a backgate of the transistor P31 are connected to an input terminal of the input voltage Vin. A drain of the transistor P31 and first terminals of the resistors R32 and R33 are connected to an application terminal of a stabilized voltage REGO. A second terminal of the resistor R32 is connected to a first terminal of the resistor R31. A second terminal of the resistor R31 is connected to a ground terminal. A noninverting input terminal (+) of the operational amplifier A31 is connected to a connection node between the resistors R31 and R32 (i.e. an application terminal of a feedback voltage Vfb). An inverting input terminal (−) of the operational amplifier A31 is connected to an application terminal of a reference voltage Vref. An output terminal of the operational amplifier A31 is connected to a gate of the transistor P31. A second terminal of the resistor R33 and a first terminal of the capacitor C31 are connected to an output terminal of the output voltage Vout. A second terminal of the capacitor C31 is connected to the ground terminal. Note that it may be possible to eliminate the resistors R31 and R32 so as to input the output voltage Vout directly to the operational amplifier A31 as the feedback voltage Vfb.

The operational amplifier A31 performs linear control of a gate signal G31 of the transistor P31 so that the feedback voltage Vfb (=REGO×R31/(R31+R32)) corresponding to the stabilized voltage REGO matches a predetermined reference voltage Vref. In other words, an ON resistance value of the transistor P31 is continuously controlled so that the stabilized voltage REGO matches its target value (=Vref× (R31+R32)/R31).

In this way, the transistor P31, the operational amplifier A31, and the resistors R31 and R32 function as an output circuit OUT that generates the stabilized voltage REGO from the input voltage Vin using the output transistor (i.e. transistor P31).

Further, the resistor R33 and the capacitor C31 function as a filter circuit FLT (i.e. RC low pass filter) that smooths the stabilized voltage REGO so as to generate the output voltage Vout. In this way, by disposing the filter circuit FLT at the latter stage of the output circuit OUT, ripple rejection characteristic can be enhanced without increasing drive current or the power supply circuit 30.

However, in the power supply circuit 30 of this comparative example, because the filter circuit FLT is used, rising of the output voltage Vout becomes slow, and hence start sequence of the system may be affected. In particular, if a high resistance resistor (e.g. approximately a few MΩ) is used as the resistor R33, the ripple rejection characteristic can be improved from a low frequency band (e.g. approximately 10 MHz), but start delay of the power supply circuit 30 becomes conspicuous.

Hereinafter, a novel embodiment that can solve the above-mentioned problem is proposed.

Power Supply Circuit (First Embodiment)

Figure 2:
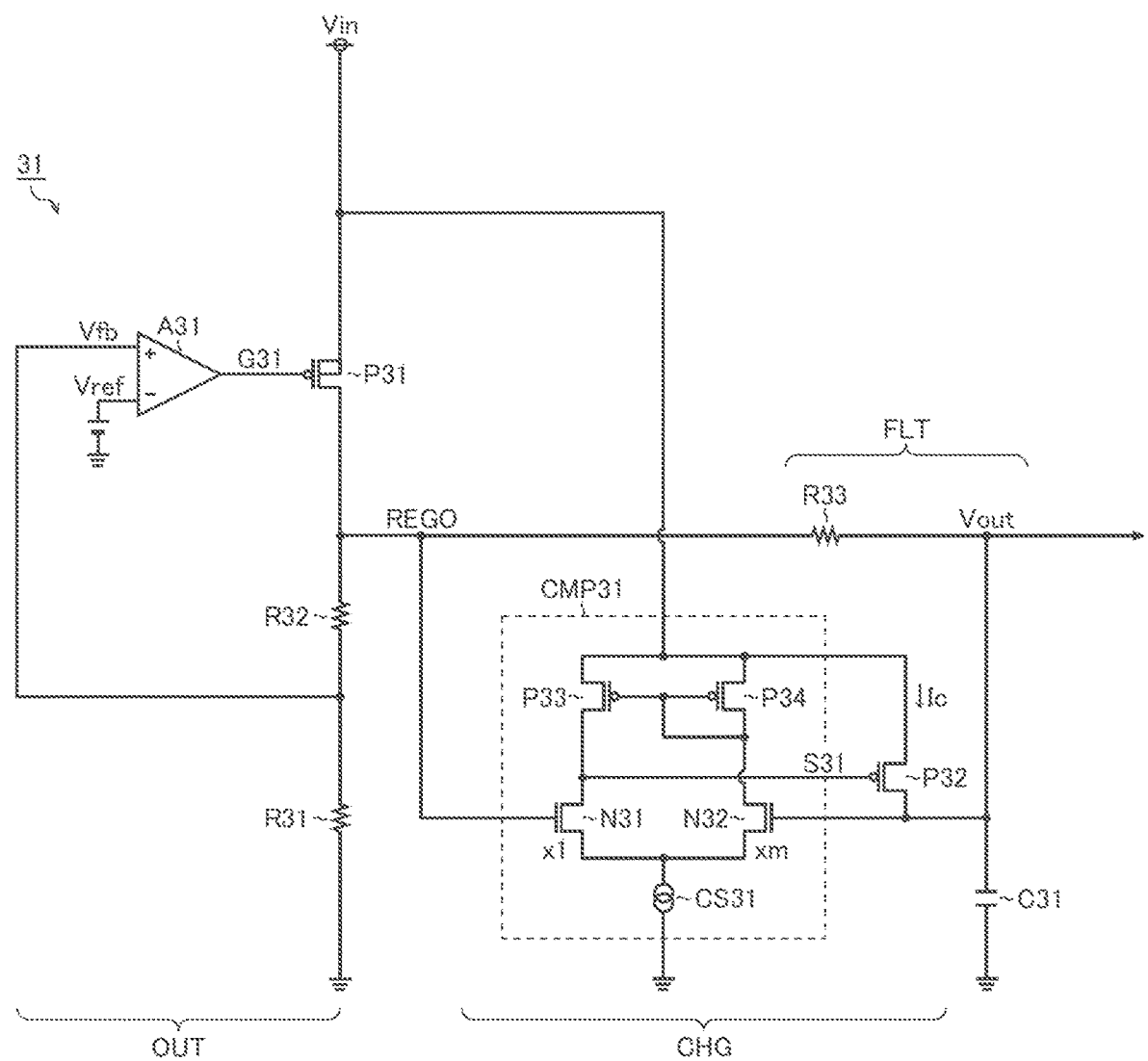
FIG. 2 is a diagram illustrating a first embodiment of the power supply circuit.

FIG. 2 is a diagram illustrating a first embodiment of the power supply circuit. A power supply circuit 31 of the first embodiment is based on the comparative example (FIG. 1) described above and includes an additional charging circuit CHG. The charging circuit CHG, which is a circuit portion that supplies charging current Ic to the capacitor C31 without the charging current Ic being passed through the resistor R33 when the power supply circuit 31 is activated, includes a comparator CMP31 and a P-channel type MOS field effect transistor P32.

The comparator CMP31, which is a charging comparator that compares the stabilized voltage REGO with the output voltage Vout so as to generate a charging control signal S31, includes P-channel type MOS field effect transistors P33 and P34, N-channel type MOS field effect transistors N31 and N32, and a current source CS31.

Sources of the transistors P32 to P34 are connected to an input terminal of the input voltage Vin. Gates of the transistors P33 and P34 are connected to a drain of the transistor P34. Drains of the transistors P33 and N31, as an output terminal of the comparator CMP31 (i.e. an output terminal of the charging control signal S31), are connected to a gate of the transistor P32. A drain of the transistor N32 is connected to the drain of the transistor P34. Sources of the transistors N31 and N32 are connected to a first terminal of the current source CS31. A second terminal of the current source CS31 is connected to the ground terminal. A gate of the transistor N31, as an inverting input terminal (−) of the comparator CMP31, is connected to an application terminal of the stabilized voltage REGO. A gate of the transistor N32, as a noninverting input terminal (+) of the comparator CMP31, is connected to an output terminal of the output voltage Vout (i.e. the first terminal of the capacitor C31) together with a drain of the transistor P32.

Note that in the comparator CMP31, a size ratio between the transistors N31 and N32 is designed to be 1:m (m>1) so that a positive offset voltage V31 is applied to the noninverting input terminal (+). Therefore, the charging control signal S31 becomes high level when Vout+V31>REGO is satisfied, while it becomes low level when Vout+V31<REGO is satisfied. Note that the offset voltage V31 should be set to an appropriate voltage value (e.g. a few tens mV) in accordance with circuit characteristics of the power supply circuit 31.

The transistor P32 is a charging switch that turns on and off the charging current Ic in accordance with the charging control signal S31. The transistor P32 is on when S31 is low level, while it is off when S31 is high level.

Charging operation of the capacitor C31 when the power supply circuit 31 is activated is described below more specifically. When the capacitor C31 is not sufficiently charged and Vout+V31<REGO is satisfied, S31 is low level, and the transistor P32 is on. Therefore, the charging current Ic is supplied to the capacitor C31 via the transistor P32 having a lower impedance than the resistor R33.

Note that the charging current Ic flowing in the transistor P32 is much larger than the charging current flowing in the resistor R33. Therefore, compared with a case where the charging circuit CHG is not used, the capacitor C31 can be rapidly charged so that the output voltage Vout can rise sharply.

After that, charging of the capacitor C31 proceeds, and when Vout+V31 becomes higher than REGO, S31 becomes high level, and the transistor P32 is turned off. In other words, before the output voltage Vout reaches the target value (=Vref×(R31+R32)/R31). the charging circuit CHG finishes its role and completed the charging operation of the capacitor C31. As a result, the filter circuit FLT functions effectively, and hence normal operation of the power supply circuit 31 is not affected.

In this way, the power supply circuit 31 can enhance the ripple rejection characteristic from a low frequency band beyond limitation of circuit characteristics without causing start delay. In addition, tolerance to input variation is also improved.

Further, when the output voltage Vout is deviated from the target value and drops due to a certain factor other than start of the power supply circuit 31, the charging circuit CHG restarts the rapid charging of the capacitor C31. Therefore, variation of the output voltage Vout can be minimized.

Note that in this diagram, the sources of the transistors P32 to P34 constituting the charging circuit CHG are connected to the input terminal of the input voltage Vin, but this connection destination is not a limitation. For instance, the sources of the transistors P32 to P34 may be connected to the application terminal of the stabilized voltage REGO. With this structure, when Vout>REGO is satisfied, the charging circuit CHG is automatically stopped, and hence overcharging of the capacitor C31 can be prevented without special control.

Figure 3:
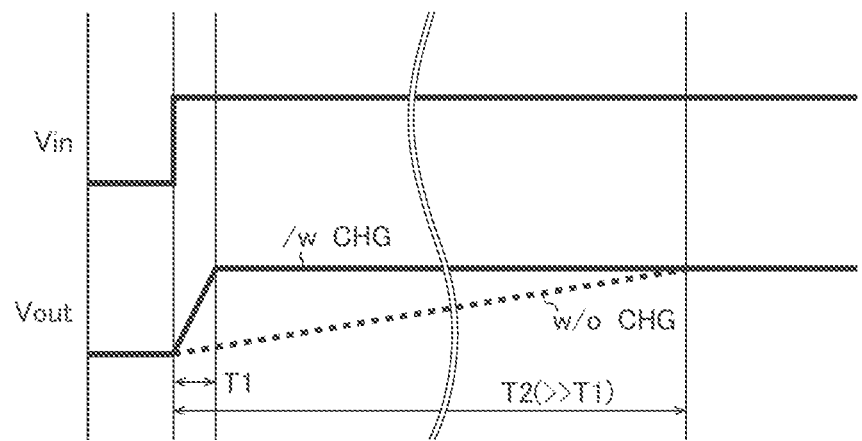
FIG. 3 is a diagram illustrating a rising behavior of an output voltage when the power supply circuit is activated.

FIG. 3 is a diagram illustrating a rising behavior of the output voltage Vout when the power supply circuit 31 is activated, in which the input voltage Vin and the output voltage Vout are shown in order from top to bottom. Note that, as for the output voltage Vout, a solid line shows behavior when the charging circuit CHG is used, while a broken line shows behavior when the charging circuit CHG is not used.

As shown in this diagram, start time T1 of the output voltage Vout when the charging circuit CHG is used is largely reduced from start time T2 when the charging circuit CHG is not used. In particular, when circuit constants of the filter circuit FLT are designed so that the ripple rejection characteristic is improved from a low frequency band (e.g. approximately 10 MHz), if the charging circuit CHG is not used, the start time T2 is a few hundreds seconds, which is unrealistic. In contrast, if the charging circuit CHG is used, the start time T1 is just a few tens approximately.

Figure 4:
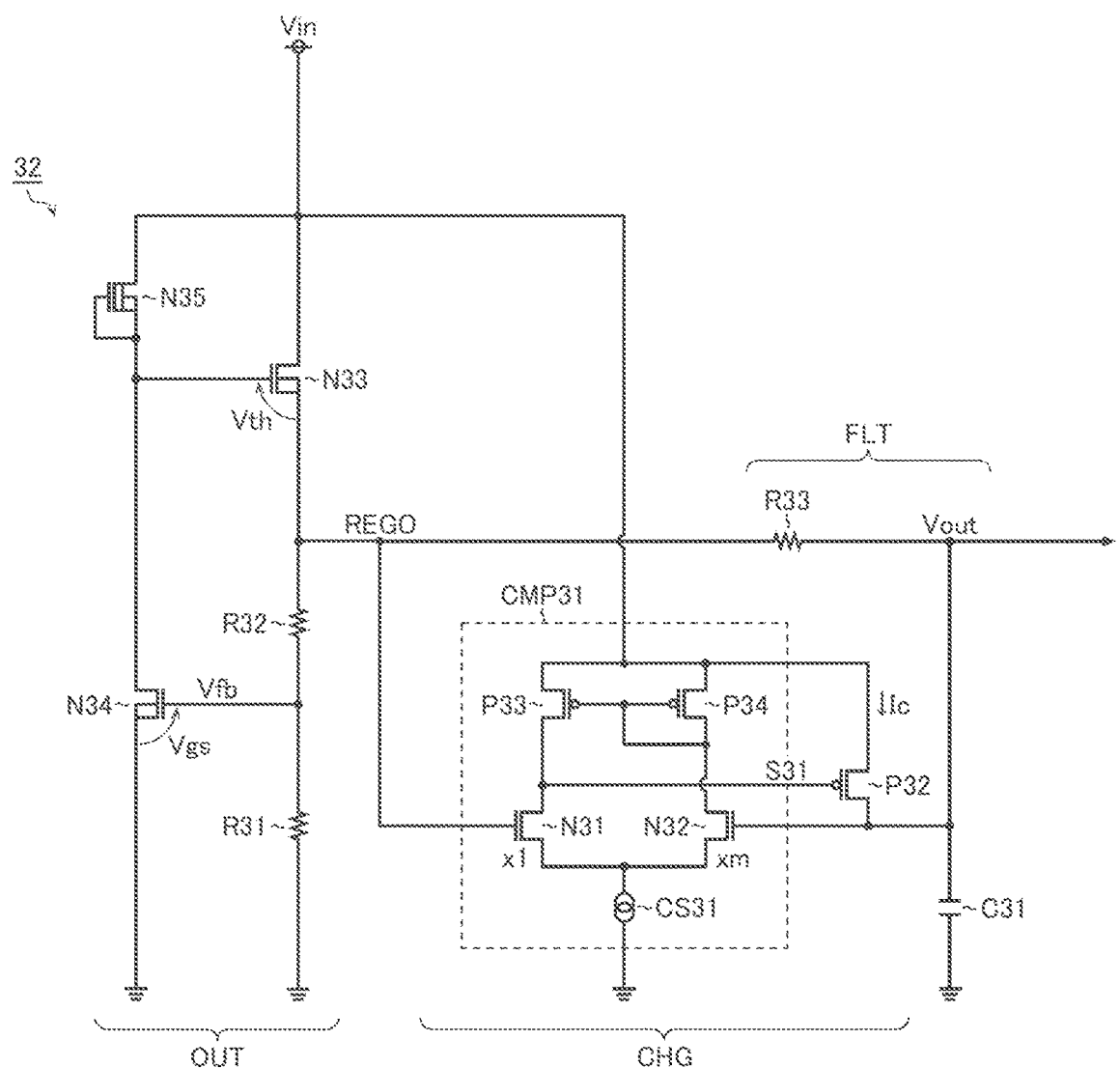
FIG. 4 is a diagram illustrating a second embodiment of the power supply circuit.

FIG. 4 is a diagram illustrating a second embodiment of the power supply circuit. A power supply circuit 32 of the second embodiment is based on the first embodiment (FIG. 2) described above and includes N-channel type MOS field effect transistors N33 to N35 instead of the transistor P31 and the operational amplifier A31. Note that the transistors N33 and N34 are an enhancement type, and the transistor N35 is a depression type.

Modification of the connection relationship is described. Drains of the transistors N33 and N35 are connected to the input terminal of the input voltage Vin. A source and a backgate of the transistor N33 are connected to the application terminal of the stabilized voltage REGO. A drain of the transistor N34, and a source, a gate and a backgate of the transistor N35 are connected to a gate of the transistor N33. A source and a backgate of the transistor N34 are connected to the ground terminal. A gate of the transistor N34 is connected to the connection node between the resistors R31 and R32 (i.e. the application terminal of the feedback voltage Vfb).

The transistors N34 and N35 perform gate control of the transistor N33 so that the feedback voltage Vfb corresponding to the stabilized voltage REGO matches a gate-source voltage Vgs of the transistor N34. In other words, an ON resistance value of the transistor N33 is continuously controlled so that the stabilized voltage REGO matches its target value (=Vgs×(R31+R32)/R31).

In this way, as the output circuit OUT, it may be possible to use a reference voltage source in which the enhancement type transistor N34 and the depression type transistor N35 are combined.

Power Supply Circuit (Third Embodiment)

Figure 5:
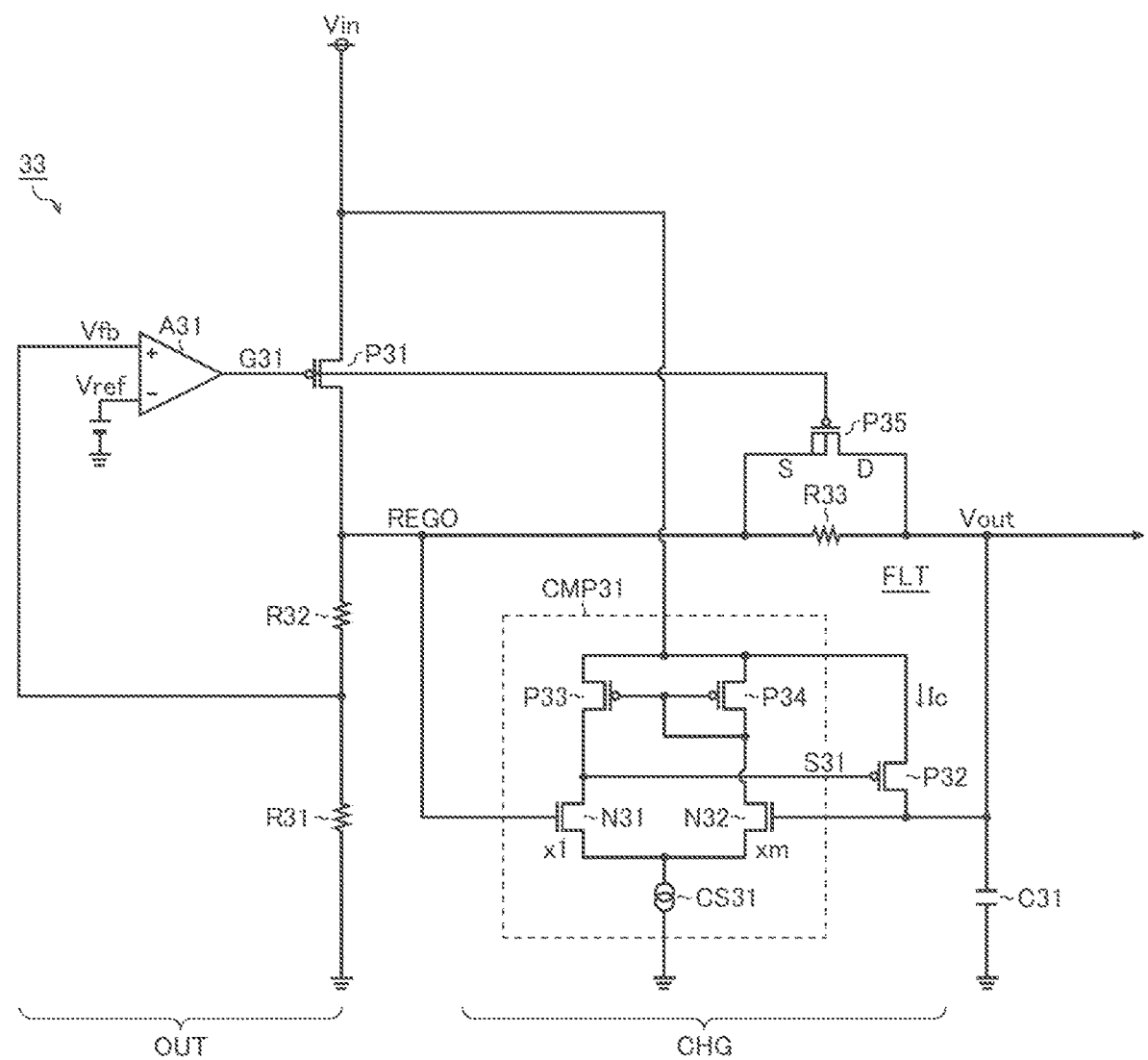
FIG. 5 is a diagram illustrating a third embodiment of the power supply circuit.

FIG. 5 is a diagram illustrating a third embodiment of the power supply circuit. A power supply circuit 33 of the third embodiment is based on the first embodiment (FIG. 2) described above, and includes an additional P-channel type MOS field effect transistor P35 disposed in parallel to the resistor R33, as a component of the charging circuit CHG.

A connection relationship is described specifically. A source of the transistor P35 is connected to the application terminal of the stabilized voltage REGO. A drain of the transistor P35 is connected to an application terminal of the output voltage Vout. A gate of the transistor P35 is connected to a gate of the transistor P31.

For instance, it is supposed that the target value of the stabilized voltage REGO is 3 V, and that the input voltage Vin is 2 V lower than the target value. In this case, the operational amplifier A31 tries to fully turn on the transistor P31, and hence the gate signal G31 is decreased to 0 V. As a result, a gate-source voltage of the transistor P35 becomes 2 V, and hence the transistor P35 is turned on.

Next, for example, it is supposed that the target value of the stabilized voltage REGO is 3 V, and that the input voltage Vin is 4 V higher than the target value. In this case, the gate-source voltage of the transistor P31 is maintained at approximately 1 V by the output feedback control by the operational amplifier A31, and hence the gate signal G31 is approximately 3 V. As a result, the gate-source voltage of the transistor P35 is substantially 0 V, and hence the transistor P35 is not turned on.

In this way, in the power supply circuit 33, the transistor P35 is turned on when the input voltage Vin is lower than the target value of the stabilized voltage REGO. Therefore, just after the input voltage Vin is supplied, the high impedance resistor R33 can be bypassed, and hence the capacitor C31 can be quickly charged.

Note that this diagram is based on the first embodiment (FIG. 2) described above, but for example, it may be possible to eliminate the comparator CMP31 and the transistor P32, and to use the transistor P35 alone as a component of the charging circuit CHG.

Further, although not illustrated again, it may be possible to use the second embodiment (FIG. 4) described above as a base and to add the transistor P35.

Power Supply Circuit (Fourth Embodiment)

Figure 6:
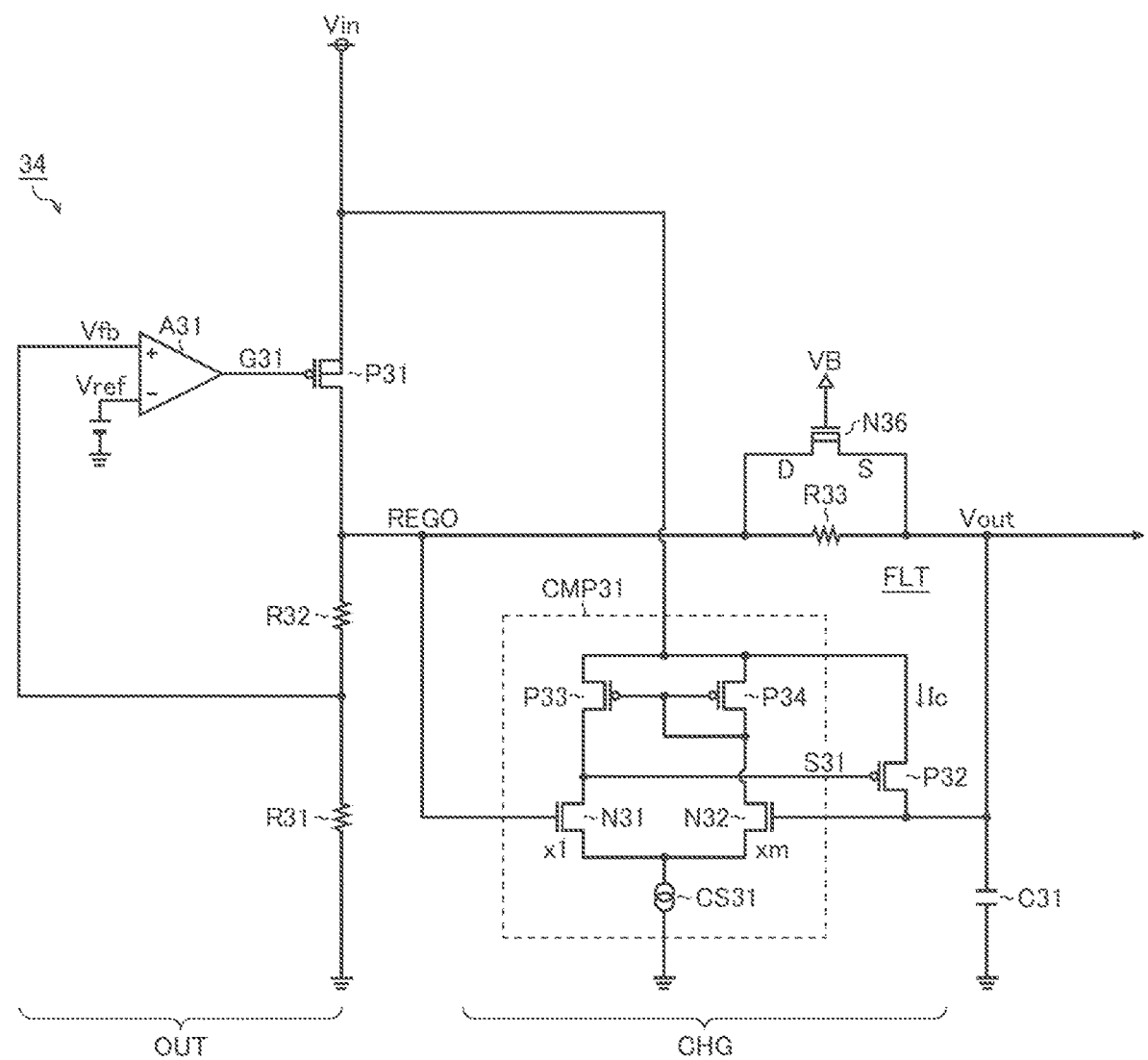
FIG. 6 is a diagram illustrating a fourth embodiment of the power supply circuit.

FIG. 6 is a diagram illustrating a fourth embodiment of the power supply circuit. A power supply circuit 34 of the fourth embodiment is based on the first embodiment (FIG. 2) described above, and includes an additional N-channel type MOS field effect transistor N36 disposed in parallel to the resistor R33, as a component of the charging circuit CHG. Note that the transistor N36 is a depression type, and an on-threshold voltage Vth thereof has a negative value (Vth<0 V).

A connection relationship is described specifically. A drain of the transistor N36 is connected to the application terminal of the stabilized voltage REGO. A source of the transistor N36 is connected to the application terminal of the output voltage Vout. A gate of the transistor N36 is connected to an application terminal of a bias voltage VB.

The transistor N36 is on when Vout<VB−Vth is satisfied, and it is off when Vout>VB−Vth is satisfied. For instance, supposing that VB is 2.7 V and Vth is −0.3 V, the transistor N36 is on when the output voltage Vout is lower than 3 V. Therefore, if the capacitor C31 is not sufficiently charged when the power supply circuit 34 is activated, the high impedance resistor R33 can be bypassed, and hence the capacitor C31 can be quickly charged.

Note that this diagram is based on the first embodiment (FIG. 2) described above, but for example, it may be possible to eliminate the comparator CMP31 and the transistor P32, and to use the transistor N36 alone as a component of the charging circuit CHG.

Further, although not illustrated again, it may be possible to use the second embodiment (FIG. 4) or the third embodiment (FIG. 5) described above as a base and to add the transistor N36.

Power Supply Circuit (Fifth Embodiment)

Figure 7:
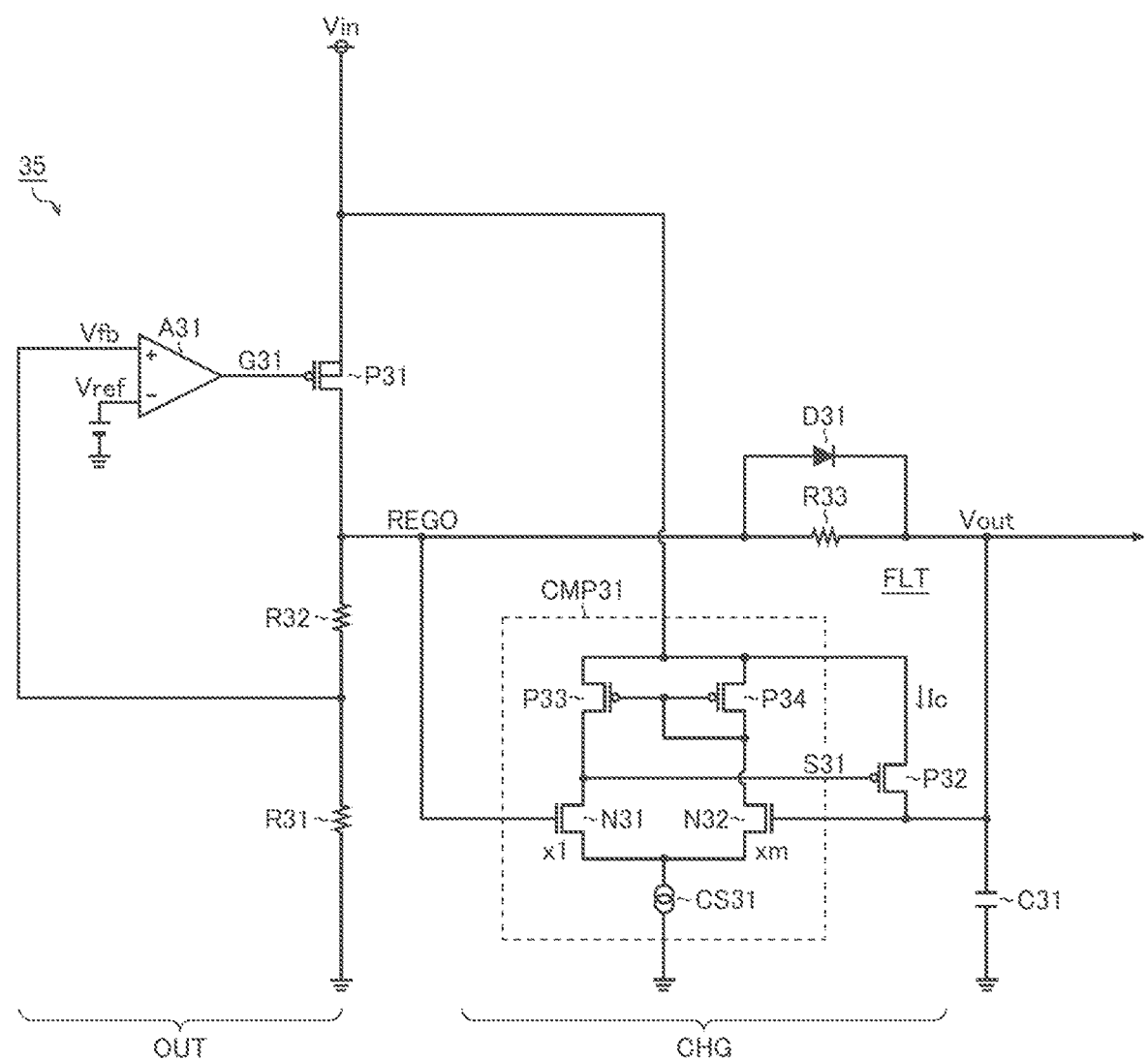
FIG. 7 is a diagram illustrating a fifth embodiment of the power supply circuit.

FIG. 7 is a diagram illustrating a fifth embodiment of the power supply circuit. A power supply circuit 35 of the fifth embodiment is based on the first embodiment (FIG. 2) described above, and includes an additional diode D31 (having a forward drop voltage Vf) disposed in parallel to the resistor R33, as a component of the charging circuit CHG.

A connection relationship is described specifically. An anode oldie diode D31 is connected to the application terminal of the stabilized voltage REGO. A cathode of the diode D31 is connected to the application terminal of the output voltage Vout. As the diode D31, it is preferred to use a Schottky barrier diode having a low forward drop voltage Vf, for example.

The diode D31 becomes forward biased when Vout<REGO−Vf is satisfied, while it becomes reverse biased when Vout>REGO−Vf is satisfied. Therefore, if the capacitor C31 is not sufficiently charged when the power supply circuit 35 is activated, the high impedance resistor R33 can be bypassed, and hence the capacitor C31 can be quickly charged.

Note that this diagram is based on the first embodiment (FIG. 2) described above, but for example, it may be possible to eliminate the comparator CMP31 and the transistor P32, and to use the diode D31 alone as a component of the charging circuit CHG.

Further, although not illustrated again, it may be possible to use the second embodiment (FIG. 4), the third embodiment (FIG. 5), or the fourth embodiment (FIG. 6) described above as a base and to add the diode D31.

Power Supply Circuit (Sixth Embodiment)

Figure 8:
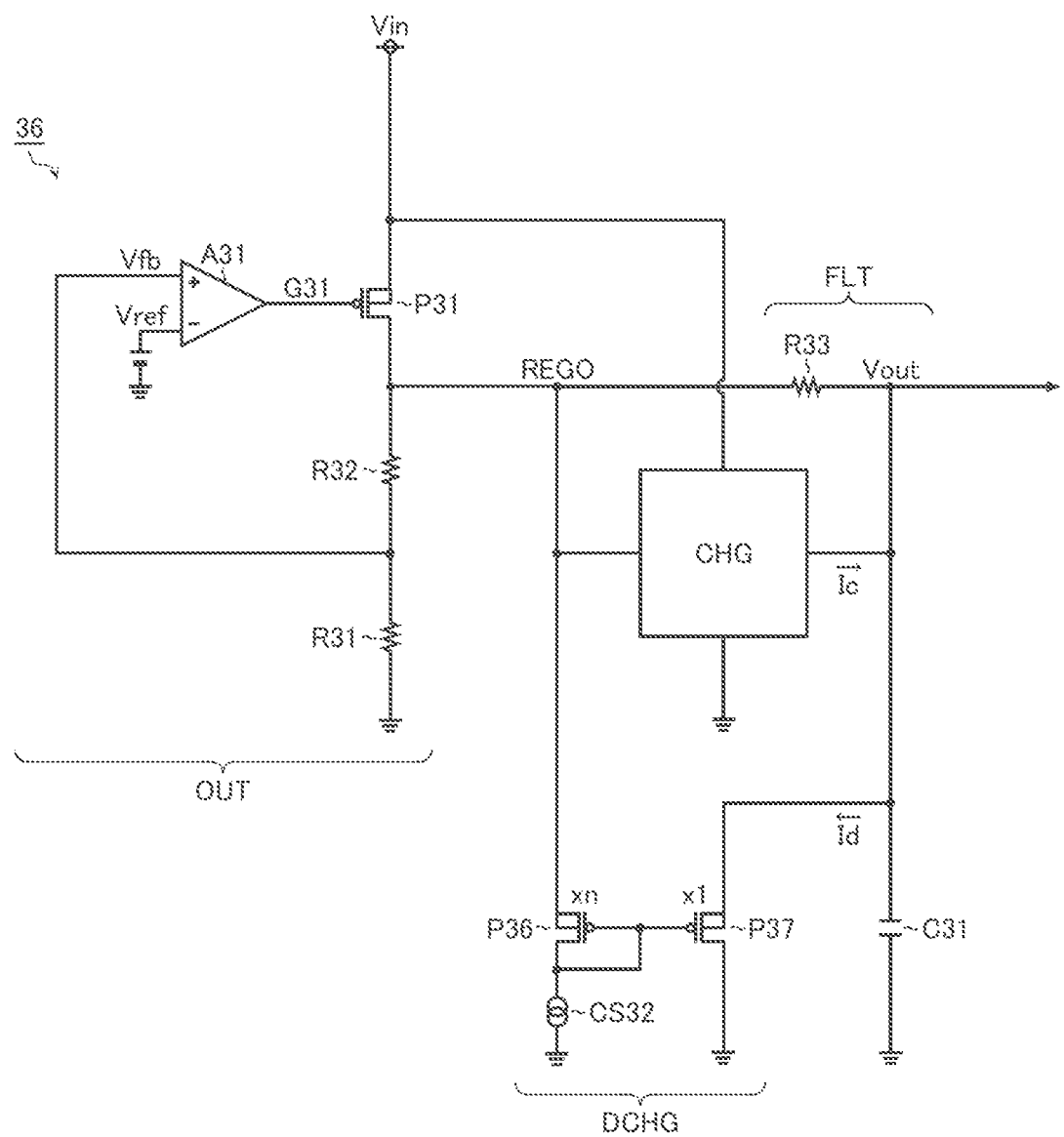
FIG. 8 is a diagram illustrating a sixth embodiment pf the power supply circuit.

FIG. 8 is a diagram illustrating a sixth embodiment of the power supply circuit. A power supply circuit 36 of the sixth embodiment is based on the first embodiment (FIG. 2) described above, and includes an additional discharge circuit DCHG. The discharge circuit DCHG, which is a circuit portion that draws a discharge current Id from the capacitor C31 without the discharge current Id being passed through the resistor R33 when the output voltage Vout is higher than a predetermined overcharge detection threshold value, includes P-channel type MOS field effect transistors P36 and P37, and a current source CS32.

A source and a backgate of the transistor P36 are connected to the application terminal of the stabilized voltage REGO. Gates of the transistors P36 and P37 are connected to a drain of the transistor P36. The drain of the transistor P36 is connected to a first terminal of the current source CS32. A drain of the transistor P37 and a second terminal of the current source CS32 are connected to the around terminal. A source and a backgate of the transistor P37 is connected to the output terminal of the output voltage Vout (i.e. the first terminal of the capacitor C31).

The transistors P36 and P37 and the current source CS32 connected in this way function as a current mirror type comparator, which compares the stabilized voltage REGO with the output voltage Vout so as to generate the discharge current Id.

In particular, in the discharge circuit DCHG, a size ratio between the transistors P36 and P37 is designed to be n:1 (n>1) so that a positive offset voltage V32 is applied to the stabilized voltage REGO side. Therefore, the discharge current Id is on when Vout>REGO+V32 is satisfied, while it is off when Vout<REGO+V32 is satisfied. Note that the offset voltage V32 should be set to an appropriate voltage value (e.g. a few tens mV) in accordance with circuit characteristics of the power supply circuit 31.

Hereinafter, significance of using the discharge circuit DCHG is described specifically. For instance, it is supposed that the target value of the stabilized voltage REGO (therefore the target value of the output Vout) is 3 V, and that the offset voltages V31 and V32 set respectively for the charging circuit CHG and the discharge circuit DCHG are 0.02 V.

In this case, ideally, when the output voltage Vout reaches 2.98 V (i.e. just before the output voltage Vout reaches the target value), the charging operation of the capacitor C31 by the charging circuit CHG should be completed. However, depending on frequency characteristics of the comparator CMP31, the charging operation of the capacitor C31 by the charging circuit CHG may not be completed even after the output voltage Vout reaches 2.98 V, and hence the capacitor C31 may be overcharged. This state may cause an overshoot of the output voltage Vout (i.e. an abnormally increased state above the target value).

In particular, when overcharging of the capacitor C31 occurs in a no-load state, if the discharge circuit DCHG is not provided, the capacitor C31 is discharged only via the high impedance resistor R33, and hence it takes a long time until the overshoot of the output voltage Vout is eliminated.

In contrast, in the power supply circuit 36 using the discharge circuit DCHG, discharging operation of the capacitor C31 by the discharge circuit DCHG starts at the timing when the output voltage Vout reaches 3.02 V. Therefore, the capacitor C31 can be rapidly discharged without the discharge current Id being passed through the high impedance resistor R33, and hence overshoot elimination time of the output voltage Vout can be reduced.

Summarizing the above, the rapid charging operation of the capacitor C31 by the charging circuit CHG is performed when Vout<REGO−V31 is satisfied, while the rapid discharging operation of the capacitor C32 by the discharge circuit DCHG is performed when Vout>REG+V32 is satisfied. Therefore, both elimination of start delay and elimination of overshoot can be achieved.

Further, when REGO−V31<Vout<REGO+V32 is satisfied, both the charging circuit CHG and the discharge circuit DCHG are disabled. Therefore, when the output voltage Vout is close to the target value, the filter circuit FLT functions effectively, and hence normal operation of the power supply circuit 36 is not affected.

Note that a gate resistor may be inserted to the transistor P37. Further, if it is difficult to set the desired offset voltage V32 by a size ratio between the transistors P36 and P37, for example, an element structure, impurity concentration, or the like may be set different between the transistors P36 and P37 so that on-threshold voltages thereof are different from each other, so as to set the desired offset voltage V32. For instance, a low breakdown voltage element (LVMOS) and a high breakdown voltage element (HVMOS) have different element structures, and hence their on-threshold voltages have a difference of approximately 1 V. Therefore, if the transistor P36 is constituted of a low breakdown voltage element while the transistor P37 is constituted of a high breakdown voltage element, the offset voltage V32 of approximately 1 V can be easily set.

Further, if the output voltage Vout is deviated from the target value and increases due to a certain factor other than start of the power supply circuit 36, the discharge circuit DCHG restarts rapid discharge of the capacitor C31. Therefore, a variation of the output voltage Vout can be minimized.

Further, although not illustrated again, it may be possible to use the second embodiment (FIG. 4), the third embodiment (FIG. 5), the fourth embodiment (FIG. 6), or the fifth embodiment (FIG. 7) described above as a base and to add the discharge circuit DCHG of this embodiment.

Power Supply Circuit (Seventh Embodiment)

Figure 9:
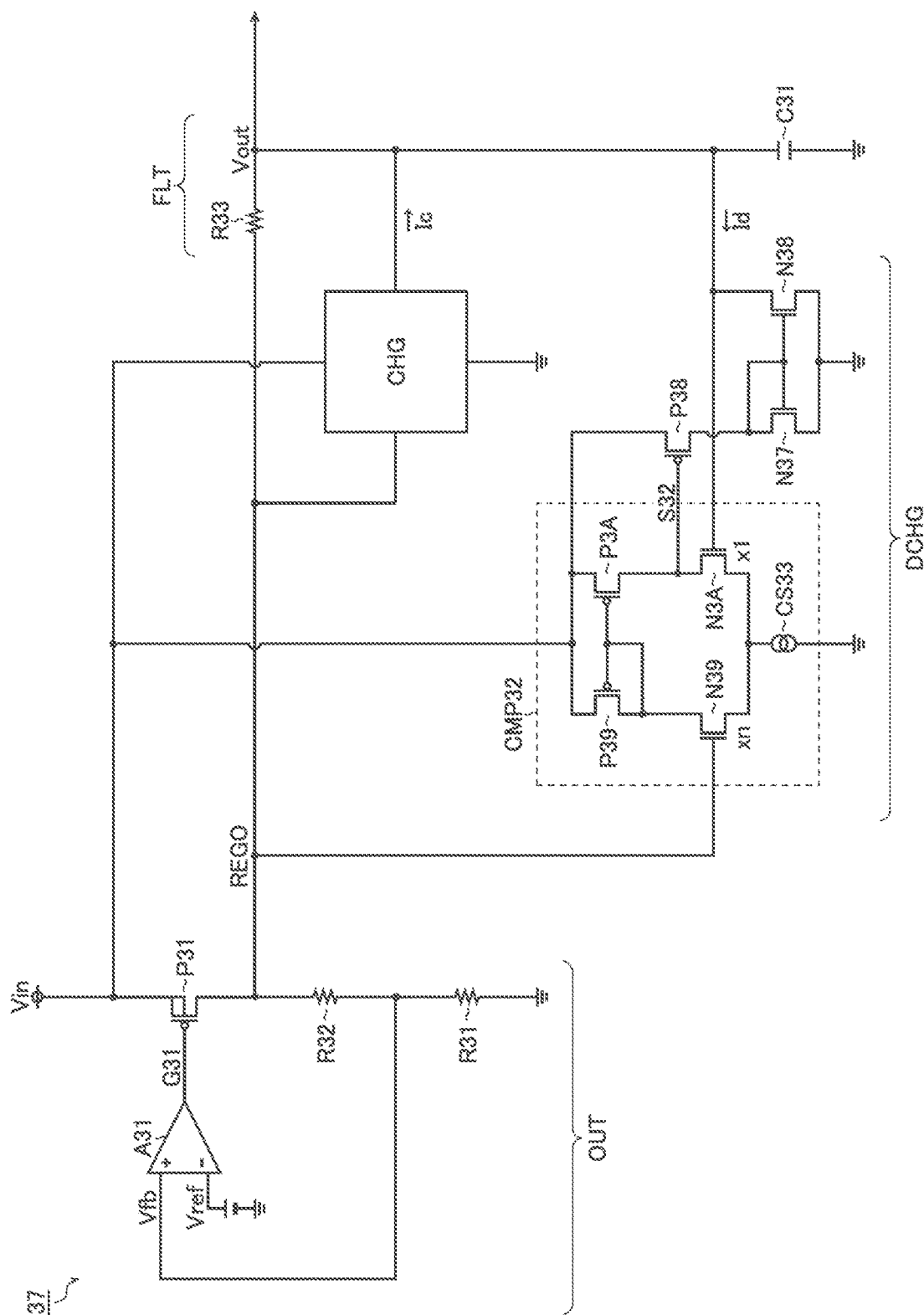
FIG. 9 is a diagram illustrating a seventh embodiment of the power supply circuit.

FIG. 9 is a diagram illustrating a seventh embodiment of the power supply circuit. A power supply circuit 37 of the seventh embodiment is based on the sixth embodiment (FIG. 8) described above, and includes a comparator CMP32, a P-channel type MOS field effect transistor P38, and N-channel type MOS field effect transistors N37 and N38, instead of the transistors P36 and P37 and the current source CS32 described above, as components of the discharge circuit DCHG.

The comparator CMP32, which is a discharge comparator that compares the stabilized voltage REGO with the output voltage Vout so as to generate a discharge control signal S32, includes P-channel type MOS field effect transistors P39 and P3A, N-channel type MOS field effect transistors N39 and N3A, and a current source CS33.

Sources of the transistors P38 to P3A are connected to the input terminal of the input voltage Vin. Gates of the transistors P39 and P3A are connected to a drain of the transistor P39. Drains of the transistors P3A and N3A, as an output terminal of the comparator CMP32 (i.e. an output terminal of the discharge control signal S32), are connected to a gate of the transistor P38. A drain of the transistor N39 is connected to a drain of the transistor P39. Sources of the transistors N39 and N3A are connected to a first terminal of the current source CS33. A second terminal of the current source CS33 is connected to the ground terminal. A gate of the transistor N39, as a noninverting input terminal (+) of the comparator CMP32, is connected to the application terminal of the stabilized voltage REGO. A gate of the transistor N3A, as an inverting input terminal (−) of the comparator CMP32, is connected to a drain of the transistor N38 and the output terminal of the output voltage Vout (i.e. the first terminal of the capacitor C31). A drain of the transistor P38 is connected to a drain of the transistor N37. Gates of the transistors N37 and N38 are connected to the drain of the transistor N37. Sources of the transistors N37 and N38 are connected to the ground terminal.

Note that in the comparator CMP32, a size ratio between the transistors N39 and N3A is designed to be n:1 (n>1) so that a positive offset voltage V32 is applied to the noninverting input terminal (+). Therefore, the discharge control signal S32 becomes high level when REGO+V32>Vout is satisfied, while it becomes low level when REGO+V32<Vout is satisfied. Note that the offset voltage V32 should be set to an appropriate voltage value (e.g. a few tens mV) in accordance with circuit characteristics of the power supply circuit 37.

The transistor P38 is a discharge switch that turns on and off the discharge current Id in accordance with the discharge control signal S32. The transistor P38 is on when S32 is low level, while it is off when S32 is high level.

The transistors N37 and N38 constitute a current mirror circuit that mirrors the drain current of the transistor P38 so as to generate the discharge current Id. Note that, as means for generating the discharge current Id, it may be possible to use, for example, a source-ground circuit or an emitter-ground circuit instead of the current mirror circuit.

Hereinafter, the discharging operation of the capacitor C31 by the discharge circuit DCHG is described more specifically. For instance, if the capacitor C31 is overcharged due to transient response of the charging circuit CHG, so that Vout>REGO+V32 is satisfied, S32 becomes low level, and hence the transistor P38 is turned on. Therefore, the discharge current Id is drawn from the capacitor C31 via the transistor N38 having a lower impedance than the resistor R33.

Note that the discharge current Id flowing in the transistor N38 is much larger than the discharge current flowing in the resistor R33. Therefore, compared with a case where the discharge circuit DCHG is not used, the capacitor C31 can be rapidly discharged so that the output voltage Vout can be rapidly restored to the target value.

After that, discharging of the capacitor C31 proceeds, and when Vout becomes lower than REGO+V32, S32 becomes high level, and the transistor P38 is turned off. In other words, the discharge circuit DCHG finishes its role and completed the discharging operation of the capacitor C31. As a result, the filter circuit FLT functions effectively, and hence normal operation of the power supply circuit 37 is not affected.

In this way, the power supply circuit 37 can achieve the same action and effect as the sixth embodiment (FIG. 8) described above.

Further, although not illustrated again, it may be possible to use the second embodiment (FIG. 4), the third embodiment (FIG. 5), the fourth embodiment (FIG. 6), or the fifth embodiment (FIG. 7) described above as a base and to add the discharge circuit DCHG of this embodiment.

Power Supply Device

Figure 10:
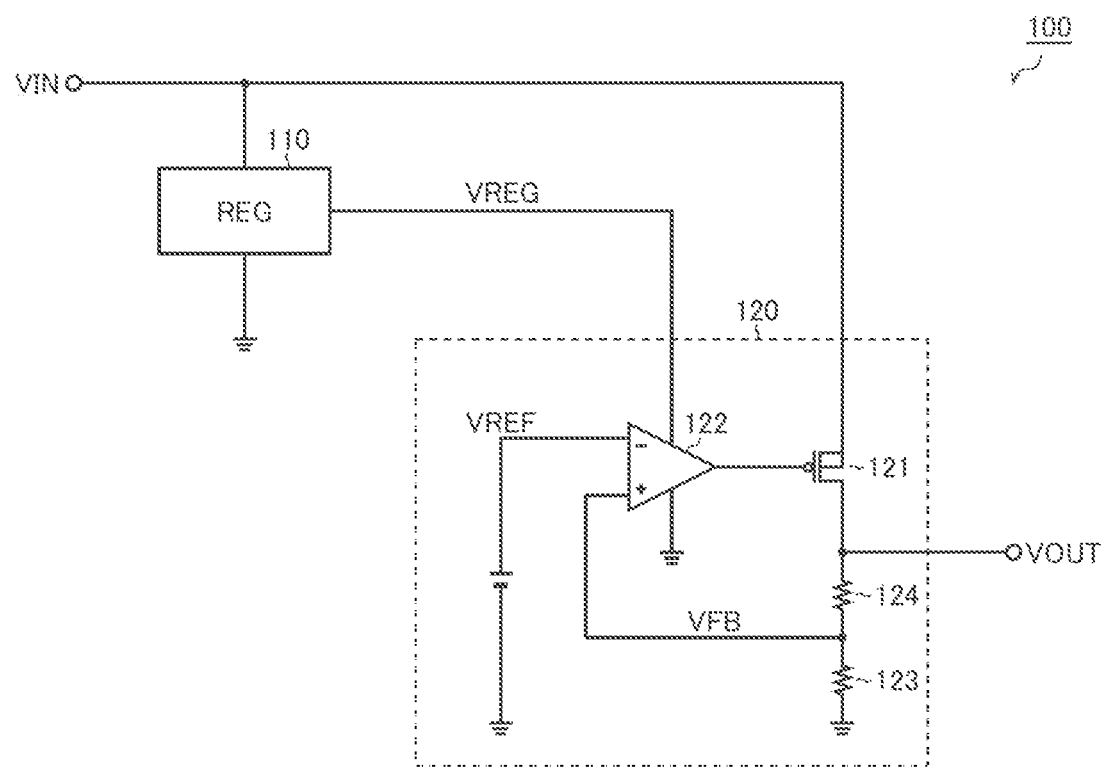
FIG. 10 is a diagram illustrating a structural example of the power supply device.

FIG. 10 is a diagram illustrating a structural example of the power supply device. A power supply device 100 of this structural example, which is a high breakdown voltage LDO regulator that steps down an input voltage VIN (e.g. 3 to 45 V) to generate a desired output voltage VOUT (e.g. 3.3 V or 5 V), includes a first power supply circuit 110, and a second power supply circuit 120.

The first power supply circuit 110 is an internal power supply circuit that steps down the input voltage VIN to generate an internal power supply voltage VREG (e.g. 4 to 5 V). Note that, as the first power supply circuit 110, it is preferred to use one of the power supply circuits 31 to 37 described above. In this case, it should be understood that VIN is Vin, and that VREG is Vout.

The second power supply circuit 120, which is a linear power supply that steps down the input voltage VIN to generate the output voltage VOUT, includes an output transistor 121 (i.e. an enhancement type PMOSFET), an operational amplifier 122, and resistors 123 and 124 (having resistance values R1 and R2, respectively).

A source and a backgate of the output transistor 121 are connected to an input terminal or the input voltage VIN. A drain of the output transistor 121 and a first terminal of the resistor 124 are connected to an output terminal of the output voltage VOUT. A second terminal of the resistor 124 is connected to a first terminal of the resistor 123. A second terminal of the resistor 123 is connected to the ground terminal. A noninverting input terminal (+) of the operational amplifier 122 is connected to a connection node between the resistors 123 and 124 (i.e. an application terminal of a feedback voltage VFB). An inverting input terminal (−) of the operational amplifier 122 is connected to an application terminal of a reference voltage VREF (e.g. 1 V). An output terminal of the operational amplifier 122 is connected to a gate of the output transistor 121. Note that it may be possible to eliminate the resistors 123 and 124 so as to input the output voltage VOUT directly to the operational amplifier 122 as the feedback voltage VFB.

The operational amplifier 122 described above performs gate control of the output transistor 121 so that the feedback voltage VFB (=VOUT×R1/(R1+R2)) corresponding to the output voltage VOUT matches the predetermined reference voltage VREF. In other words, an ON resistance value of the output transistor 121 is continuously controlled so that the output voltage VOUT matches its target value (=VREF×(R1+R2)/R1).

Here, control system circuits such as the operational amplifier 122 are supplied not with the input voltage VIN but with the internal power supply voltage VREG obtained by stepping down the input voltage VIN. With this structure, a control system circuit can be constituted of a lower breakdown element than the output transistor 121 applied with the input voltage VIN, and hence its circuit area can be reduced.

Note that the power supply circuits 31 to 37 described above can be used also as means for generating a reference voltage VREF (i.e. an internal reference voltage) from the input voltage VIN (or the internal power supply voltage VREG). In this case, it should be understood that VIN (or VREG) is Vin, and that VREF is Vout.

Further, although not illustrated again, it may be possible to use a switching power supply instead of the linear power supply as the second power supply circuit 120.

Application to Vehicles

Figure 11:
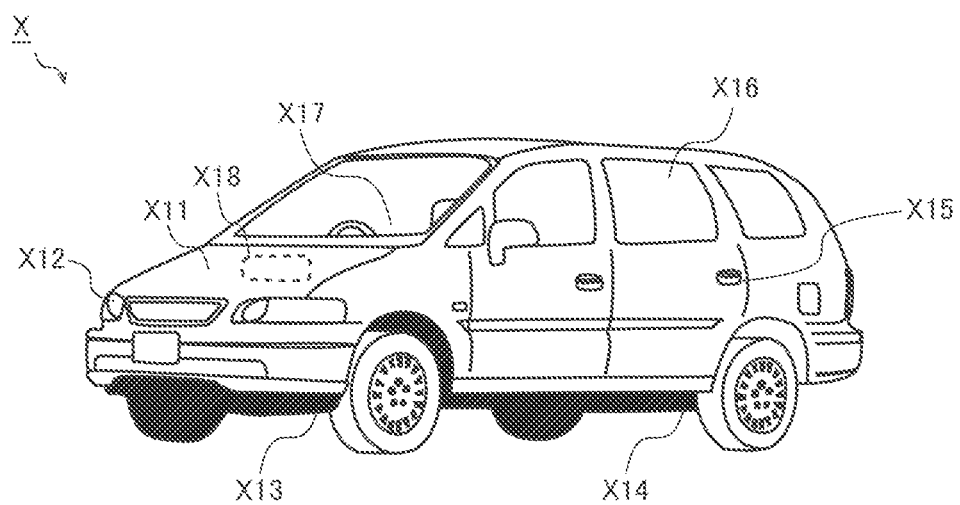
FIG. 11 is a diagram illustrating an external view of a vehicle.

FIG. 11 is a diagram illustrating an external view of a vehicle. A vehicle X of this structural example is equipped with various electronic devices X11 to X18 that work with power supplied from a battery (not shown). Note that mounting positions of the electronic devices X11 to X18 in this diagram may be different from real positions, for convenience sake of illustration.

The electronic device X11 is an engine control unit, which performs engine-related control (such as injection control, electronic throttle control, idling control, oxygen sensor heater control, and auto cruise control).

The electronic device X12 is a lamp control unit, which performs on/off control of a high intensity discharged lamp (HID), a daytime running lamp (DRL), and the like.

The electronic device X13 is a transmission control unit, which performs transmission-related control.

The electronic device X14 is a braking unit, which performs control related to kinetics of the vehicle X (such as anti-lock brake system (ABS) control, electric power steering (EPS) control, and electronic suspension control).

The electronic device X15 is a security control unit, which performs drive control of a door lock, a security alarm, and the like.

The electronic device X16 is an electronic device such as a wiper, an electric mirror, a power window, a damper (shock absorber), an electric sun-roof, and an electric seat, which are equipped to the vehicle X when shipped from factory, as standard equipment or manufacturer options.

The electronic device X17 is an electronic device such as an in-vehicle audio/visual (A/V) device, a car navigation system, and an electronic toll collection system (ETC), which are equipped to the vehicle X as user options.

The electronic device X18 is an electronic device such as an in-vehicle blower, an oil pump, a water pump, a battery cooling fan, which are equipped with a high breakdown voltage motor.

The power supply device 100 described above can be incorporated in either one of the electronic devices X11 to X18.

Embodiments Other Than Above

Hereinafter, examples of the embodiments of the present invention are specifically described with reference to the drawings. In the drawings to be referred to, the same part is denoted by the same numeral or symbol, and overlapping description of the same part is omitted as a rule. Note that, in this specification, for simple description, a name of information, signal, physical quantity, element, part, or the like may be omitted or abbreviated, by referring to the numeral or symbol corresponding to the information, signal, physical quantity, element, part, or the like. For instance, a charging transistor denoted by M2 described later (see FIG. 13) may be expressed as a charging transistor M2 or a transistor M2, which indicate the same thing.

First, several terms used in the description of the embodiments of the present invention are defined below. In the embodiments of the present invention, "IC" is abbreviation for integrated circuit. The term "ground" means a conductive part having a potential of 0 V (zero volts) to be a reference, or the potential of 0 V itself. The potential of 0 V may also referred to as a ground potential. In the embodiments of the present invention, a voltage mentioned without any specific reference indicates a potential with respect to the ground.

In any transistor constituted as a field effect transistor (FET), an on state means that the transistor is conductive between its drain and source, while an off state means that the transistor is not conductive (cut off) between its drain and source. The same is true for a transistor that is not classified as an FET. Hereinafter, on state and off state may be simply expressed as on and off, respectively.

In any MOSFET in the following description, unless otherwise noted, it is supposed that a backgate is connected to a source. "MOSFET is an abbreviation for "metal-oxide-semiconductor field effect transistor". A MOSFET should be understood as an enhancement type MOSFET unless otherwise noted. In any transistor constituted as a MOSFET, a gate-source voltage means a gate potential with respect to a source potential.

Eighth Embodiment

Figure 12:
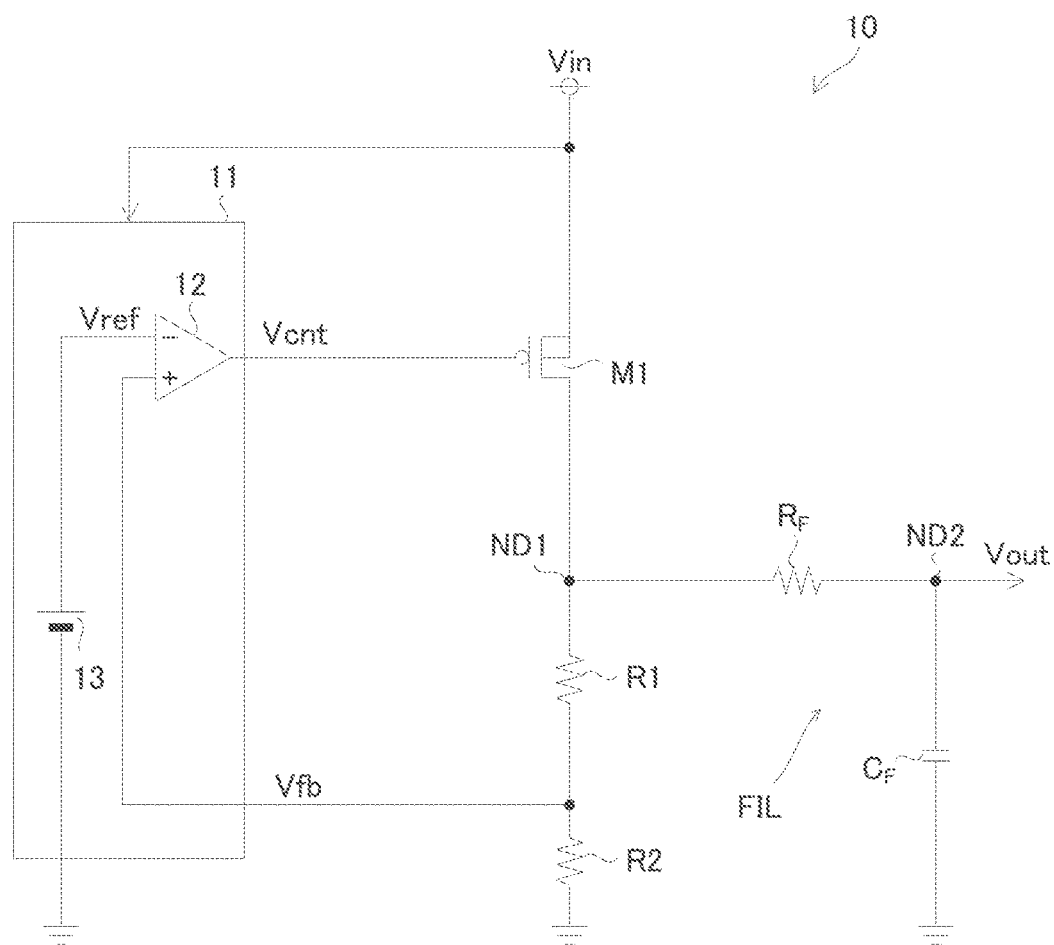
FIG. 12 is a circuit diagram of the power supply circuit according to an eighth embodiment of the present invention.

An eighth embodiment of the present invention is described. FIG. 12 is a circuit diagram of a power supply circuit 10 according to the eighth embodiment of the present invention. The power supply circuit 10 generates a stabilized voltage as the output voltage Vout from the given input voltage Vin. The input voltage Vin is a positive DC voltage, and a target voltage Vtg of the output voltage Vout, with which the output voltage Vout should match, is also a positive DC voltage. The power supply circuit 10 is a step-down type linear regulator, in which the output voltage Vout is lower than or equal to the input voltage Vin.

The power supply circuit 10 includes an output transistor M1 constituted as a P-channel type MOSFET, the feedback resistors R1 and R2, a resistor $R_F$ as a filter resistor, a capacitor $C_F$ as a filter capacitor and a control circuit 11. The feedback resistors R1 and R2 constitute a feedback circuit. The resistor $R_F$ and the capacitor $C_F$ constitute a filter circuit FIL that is an RC filter. The power supply circuit 10 also includes other element that is not shown in FIG. 12, which will be described later, and the structure illustrated in FIG. 12 is described first.

The input voltage Vin is applied to a source of the output transistor M1. A drain of the output transistor M1 is connected to a node ND1. In FIG. 12, the drain of the output transistor M1 is directly connected to the node ND1, but a resistor may be inserted between the drain of the output transistor M1 and the node ND1 (details will be described later).

The filter circuit FIL smooths a voltage at the node ND1 so as to generate the smoothed voltage as the output voltage Vout (stabilized voltage). The output voltage Vout is generated at a node ND2. Specifically, the node ND1 is connected to one terminal of the resistor $R_F$, and the other terminal of the resistor $R_F$ and one terminal of the capacitor $C_F$ are connected at the node ND2. The other terminal of the capacitor $C_F$ is connected to the ground. Therefore, the voltage across the terminals of the capacitor $C_F$ (i.e. charged voltage of the capacitor $C_F$) is the output voltage Vout as the stabilized voltage.

The feedback circuit constituted of the feedback resistors R1 and R2 is disposed between the node ND1 and the ground so as to generate a feedback voltage Vfb corresponding to the voltage at the node ND1. Specifically, one terminal of the feedback resistor R1 is connected to the node ND1, and the other terminal of the feedback resistor R1 is connected to the ground via the feedback resistor R2. The feedback voltage Vfb is generated at the connection node between the feedback resistors R1 and R2. The feedback voltage Vfb is given to the control circuit 11. If a discharge current of the capacitor $C_F$ is sufficiently small, and if the power supply circuit 10 is in a stable state, the voltage at the node ND1 is substantially the same as the output voltage Vout, and hence the feedback voltage Vfb is understood to be a voltage proportional to the output voltage Vout.

The control circuit 11 works with the input voltage Vin and controls a gate voltage of the output transistor M1 so that the feedback voltage Vfb matches a predetermined reference voltage Vref. As a result, a voltage determined by a ratio between the resistance values of the feedback resistors R1 and R2 and the reference voltage Vref is set as the target voltage Vtg, and the control circuit 11 continuously controls an ON resistance value of the output transistor M1 so that the output voltage Vout matches the target voltage Vtg (strictly speaking, so that a voltage at the node ND1 matches the target voltage Vtg). The target voltage Vtg is expressed as "Vtg=Vref×(R1+R2)/R2".

The control circuit 11 includes an amplifier 12 that is an operational amplifier, and a reference voltage source 13 that generates the reference voltage Vref. The reference voltage Vref has a positive predetermined DC voltage value (e.g. 0.5 V). The reference voltage Vref is input to an inverting input terminal of the amplifier 12, the feedback voltage Vfb is input to a noninverting input terminal of the amplifier 12, and an output terminal of the amplifier 12 is connected to a gate of the output transistor M1. Therefore, the amplifier 12 controls the gate voltage of the output transistor M1 so that the feedback voltage Vfb matches the predetermined reference voltage Vref.

In the following description, a voltage output from the output terminal of the amplifier 12 is referred to as a control voltage Vcnt. Using a term "control voltage Vcnt", the following expression can be derived. On the basis of the feedback voltage Vfb and the predetermined reference voltage Vref, the control circuit 11 generates the control voltage Vcnt for matching the feedback voltage Vfb and the predetermined reference voltage Vref, and supplies the control voltage Vcnt to the gate of the output transistor M1, so as to control a state of the output transistor M1. Note that a negative side power supply voltage of the control circuit 11 is 0 V.

The power supply circuit 10 includes the filter circuit FIL as an RC filter, and hence has good ripple rejection characteristic. The ripple rejection characteristic in this specification means characteristic for rejecting micro noise that is superimposed on the output voltage Vout due to operation of the power supply circuit 10, and it includes a power supply voltage fluctuation rejection ratio.

Although good ripple rejection characteristic can be achieved, the filter circuit FIL tends to cause slow start of the power supply circuit 10. In other words, when the power supply circuit 10 is activated, it may take a long time for the output voltage Vout to increase up to the target voltage Vtg. Although not illustrated in FIG. 12, the power supply circuit 10 is equipped with a circuit that increases start speed.

In Examples EX1_1 to EX1_3 of the eighth embodiment give below, specific examples of the circuit for increasing the start speed are described. The above description of the eighth embodiment is applied to Examples EX1_1 to EX1_3 below unless otherwise noted and unless any contradiction occurs. In each Example, if there is a description incompatible with the above description of the eighth embodiment, the description in each Example should be given higher priority. Further, unless any contradiction occurs, description in any one of Examples EX1_1 to EX1_3 can be applied to other Example (i.e., any two or more Examples can be combined).

Example EX1_1

Figure 13:
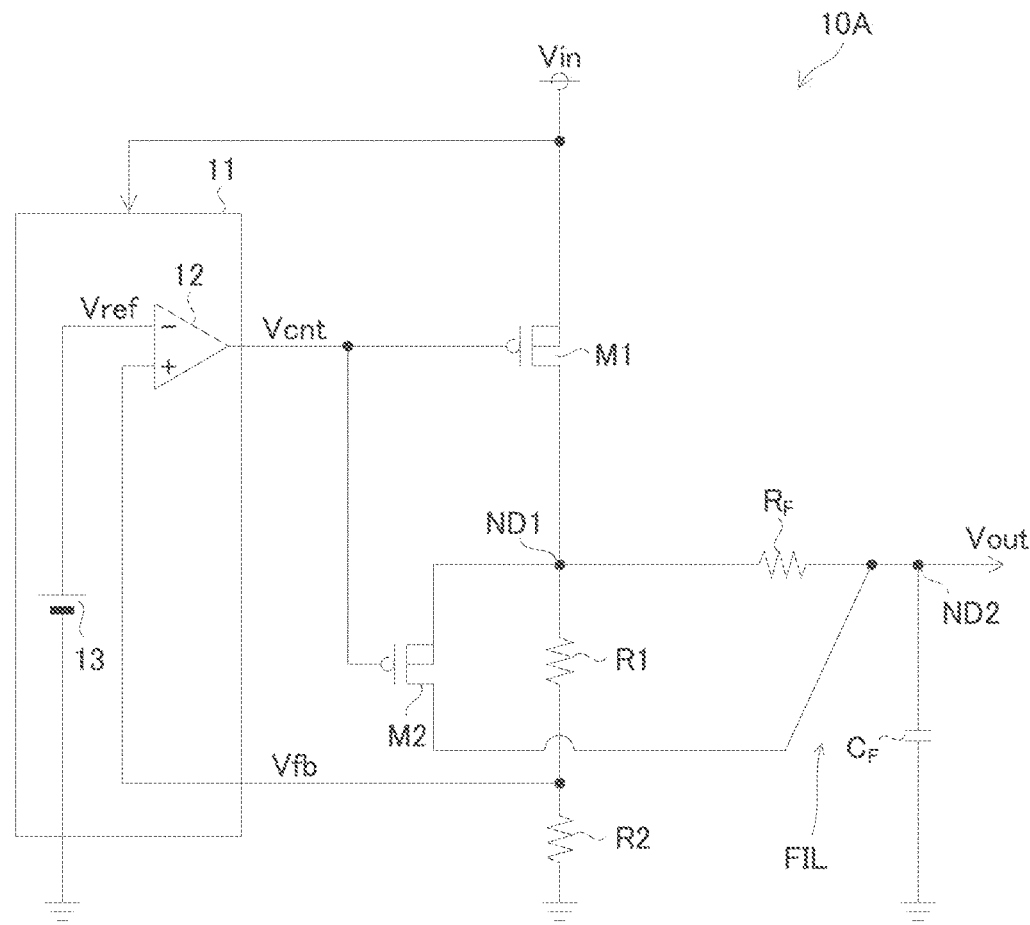
FIG. 13 is a circuit diagram of the power supply circuit according to Example EX1_1 of the eighth embodiment of the present invention.

Example EX1_1 is described. FIG. 13 is a circuit diagram of a power supply circuit 10A according to Example EX1_1. The power supply circuit 10A of FIG. 13 is one example of the power supply circuit 10. The power supply circuit 10A of FIG. 13 has a structure in which the charging transistor M2 is added to the power supply circuit 10 of FIG. 12. Except this addition, the power supply circuit 10A of FIG. 13 is the same as the power supply circuit 10 of FIG. 12. Therefore, in Example EX1_1, only a structure and an operation related to the addition of the charging transistor M2 are described below.

The charging transistor M2 is a P-channel type MOSFET. A source of the charging transistor M2 is connected to the node ND1, and a drain of the charging transistor M2 is connected to the node ND2. A gate of the charging transistor M2 is connected to the output terminal of the amplifier 12. Therefore, the control voltage Vcnt is applied to the gates of the output transistor M1 and the charging transistor M2, and a state (on/off state) of the charging transistor M2 is controlled in accordance with the control voltage Vcnt, similarly to the output transistor M1.

Figure 14:
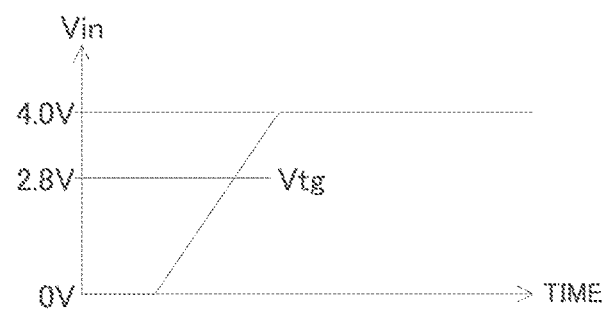
FIG. 14 is a diagram illustrating a temporal change of an input voltage to the power supply circuit according to Example EX1_1 of the eighth embodiment of the present invention.

It is supposed that the input voltage Vin is gradually increased from 0 V to 4.0 V as illustrated in FIG. 14. Further, for specific description, it is supposed that the target voltage Vtg is 2.8 V. In addition, it is supposed that a threshold voltage Vth[M1] of the output transistor M1 and a threshold voltage Vth[M2] of the charging transistor M2 are both −0.7 V (see FIG. 15).

In the output transistor M1, if a gate potential is lower than a source potential and if an absolute value of a gate-source voltage of the output transistor M1 is the voltage value |Vth[M1]| or higher, the output transistor M1 becomes on state, and otherwise the output transistor M1 becomes off state. Similarly, in the charging transistor M2, if a gate potential is lower than a source potential and if an absolute value of a gate-source voltage of the charging transistor M2 is the voltage value |Vth[M2]| or higher, the charging transistor M2 becomes on state, and otherwise the charging transistor M2 becomes off state. The voltage values |Vth[M1]| and |Vth[M2]| indicate absolute values of the threshold voltages Vth[M1] and Vth[M2], respectively. When the output transistor M1 is on state, as the absolute value of the gate-source voltage of the output transistor M1 is higher, an ON resistance value of the output transistor M1 is smaller. The same is true for the charging transistor M2.

Figure 15:
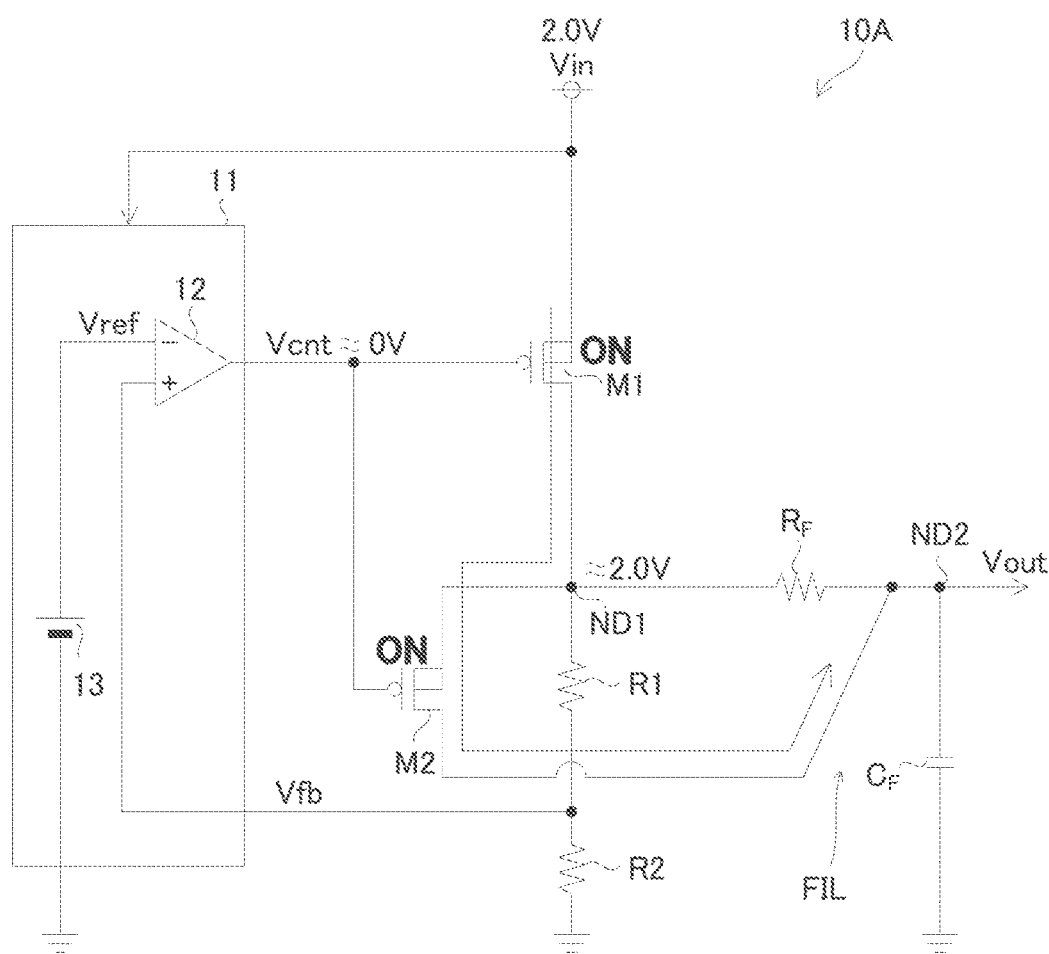
FIG. 15 is a diagram for explaining a behavior of the power supply circuit when the input voltage is lower than a target voltage in the power supply circuit, according to Example EX1_1 of the eighth embodiment of the present invention.

FIG. 15 is a diagram showing a behavior of the power supply circuit 10A when the input voltage Vin is 2.0 V. The control circuit 11 is configured to be capable of working if the input voltage Vin is higher than or equal to a predetermined start voltage lower than 2.0 V. In other words, the control circuit 11 can generate and output the control voltage Vcnt for matching the feedback voltage Vfb and the predetermined reference voltage Vref if the input voltage Vin is the start voltage or higher.

The amplifier 12 works to decrease the control voltage Vcnt more as the voltage at the node ND1 is lower. Therefore, after the control circuit 11 is activated, in a state where the input voltage Vin is sufficiently lower than the target voltage Vtg, the control voltage Vcnt matches the lowest voltage that the amplifier 12 can output. The lowest voltage that the amplifier 12 can output substantially matches the negative side power supply voltage of the amplifier 12 and is substantially 0 V. When the lowest voltage that the amplifier 12 can output becomes the control voltage Vcnt, the output transistor M1 is on state, and an ON resistance value of the output transistor M1 is minimized. A state of the output transistor M1 in this case is particularly referred to as a full on state.

When the input voltage Vin is 2.0 V as illustrated in FIG. 15, the control voltage Vcnt is the lowest voltage that the amplifier 12 can output, and the output transistor M1 becomes a full on state. Considering that the ON resistance value of the output transistor M1 in this case is sufficiently small, and neglecting the ON resistance value, the voltage at the node ND1 is also 2.0 V. Then, the charging transistor M2 is also on state, and hence current from the terminal applied with the input voltage Vin via the output transistor M1 flows to the capacitor $C_F$ not through the resistor $R_F$ but through the charging transistor M2, so as to charge the capacitor $C_F$.

Figure 16:
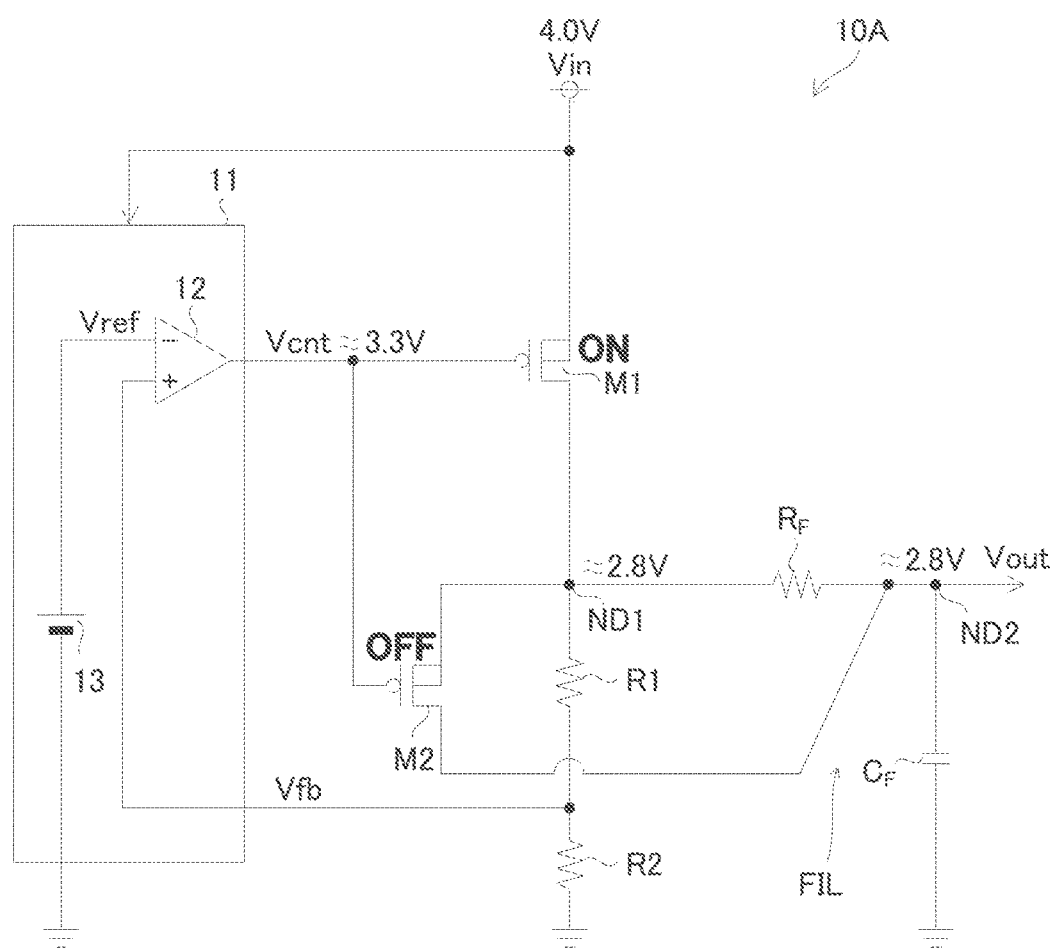
FIG. 16 is a diagram for explaining a behavior of the power supply circuit when the input voltage is higher than the target voltage in the power supply circuit, according to Example EX1_1 of the eighth embodiment of the present invention.

FIG. 16 is a diagram showing a behavior of the power supply circuit 10A when the input voltage Vin is 4.0 V and the output voltage Vout is stabilized at the target voltage Vtg (2.8 V in this example). In the stable state where the input voltage Vin is 4.0 V, the amplifier 12 generates the control voltage Vcnt on the basis of the feedback voltage Vfb so that the voltage at the node ND1 matches the target voltage Vtg (i.e. so that the output voltage Vout matches the target voltage Vtg), and hence the control voltage Vcnt becomes approximately Vin−|Vth[M1]|, i.e. approximately 3.3 V, and in this case the voltages at the node ND1 and at the node ND2 are approximately 2.8 V. Then, a reverse bias is applied to the charging transistor M2, and hence the charging transistor M2 is off state. Therefore, when charging current flows to the capacitor $C_F$ in the state where the input voltage Vin is 4.0 V, the charging current flows not through the charging transistor M2 but through the resistor $R_F$.

In this way, in a predetermined first state where the input voltage Vin is lower than the target voltage Vtg (e.g. the state where Vin is 2.0 V as shown in FIG. 15), on the basis of the feedback voltage Vfb, the control circuit 11 generates the control voltage Vcnt, which is a voltage that allows both the output transistor M1 and the charging transistor M2 to be on state (e.g. the lowest voltage that the amplifier 12 can output). In contrast, in a predetermined second state where the input voltage Vin is higher than the target voltage Vtg (e.g. the state where Vin is 4.0 V as shown in FIG. 16), on the basis of the feedback voltage Vfb, the control circuit 11 generates the control voltage Vcnt, which is a voltage that allows the output transistor M1 to be on state and allows the charging transistor M2 to be off state (e.g. 3.3 V).

If a difference between the voltages Vin and Vtg is very small, the charging transistor M2 behaves as an analog element and is in an intermediate state between on state and oil state. Therefore, the above-mentioned predetermined first state can be understood to be a state where the input voltage Vin is lower than the target voltage Vtg and the difference between the voltages Vin and Vtg is a predetermined voltage value (e.g. 0.5 V) or larger. Similarly, the above-mentioned predetermined second state can be understood to be a state where the input voltage Vin is higher than the target voltage Vtg and the difference between the voltages Via and Vtg is the predetermined voltage value (e.g. 0.5 V) or larger. The control voltage Vcnt in the predetermined first state can also be understood to be a voltage for allowing the output transistor M1 to be full on state.

According to Example EX1_1, when the power supply circuit 10A is activated (when the input voltage Vin rises), the capacitor $C_F$ is charged not through the resistor $R_F$ but through the charging transistor M2, and hence the output voltage Vout rises rapidly. Further, after the input voltage Vin becomes higher than the target voltage Vtg, the charging transistor M2 is fixed to off state so that the filter circuit FIL including the resistor $R_F$ functions effectively. Therefore, the start speed can be increased while good ripple rejection characteristic with the filter circuit FIL is maintained.

Note that, in the power supply circuit 10A, depending on a rising rate of the input voltage Vin, a response speed of the amplifier 12, or other factor, there may be little chance of charging the capacitor $C_F$ through the charging transistor M2, and the charging transistor M2 may be oil state. Therefore, it may be possible to modify the control circuit 11 to include a circuit that detects a variation of the input voltage Vin, and a circuit that maintains the control voltage Vcnt at 0 V or near 0 V for a certain period (e.g. 500 µS) regardless of the feedback voltage Vfb when it is detected that the input voltage Vin starts to rise from 0 V.

Example EX1_2

Figure 17:
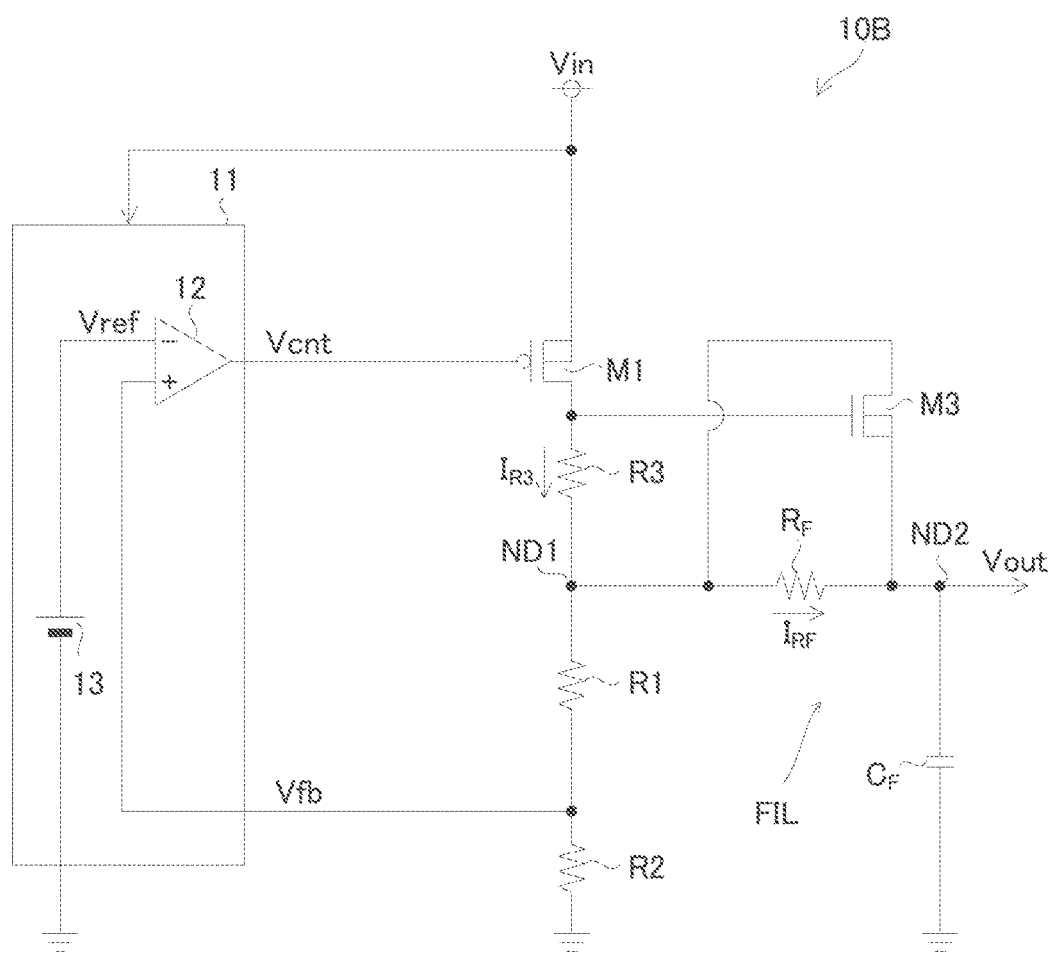
FIG. 17 is a circuit diagram of the power supply circuit according to Example EX1_2 of the eighth embodiment of the present invention.

Example EX1_2 is described. FIG. 17 is a circuit diagram of a power supply circuit 10B according to Example EX1_2. The power supply circuit 10B of FIG. 17 is one example of the power supply circuit 10. The power supply circuit 10B of FIG. 17 has a structure in which a charging transistor M3 and an inserted resistor R3 are added to the power supply circuit 10 of FIG. 12. Except this addition, the power supply circuit 10B of FIG. 17 is the same as the power supply circuit 10 of FIG. 12. Therefore, in Example EX1_2, only a structure and an operation related to the addition of the charging transistor M3 and the inserted resistor R3 are described below.

The charging transistor M3 is an N-channel type MOSFET. A drain of the charging transistor M3 is connected to the node ND1, and a source of the charging transistor M3 is connected to the node ND2. In the power supply circuit 10B, the inserted resistor R3 is disposed between the drain of the output transistor M1 and the node ND1. In other words, one terminal of the inserted resistor R3 is connected to the drain of the output transistor M1, and the other terminal of the inserted resistor R3 is connected to the node ND1. The inserted resistor R3 is provided for allowing the charging transistor M3 to be on state when the power supply circuit 10B is activated. Current flowing in the inserted resistor R3 is denoted by $I_{R3}$, and current flowing in the resistor $R_F$ is denoted by $I_{RF}$.

Figure 18:
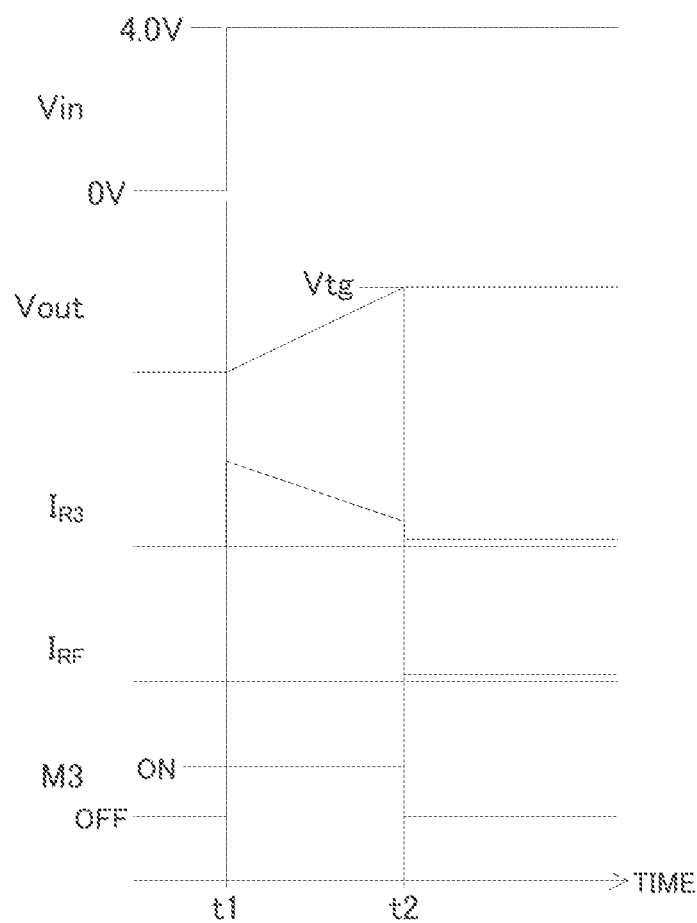
FIG. 18 is a timing chart for explaining an operation of the power supply circuit when it is activated, according to Example EX1_2 of the eighth embodiment of the present invention.

With reference to FIG. 18, an operation of the power supply circuit 10B when it is activated is described. In FIG. 18, it is supposed that the input voltage Vin rises rapidly from 0 V to 4.0 V at timing t1. Further, it is supposed that the target voltage Vtg is 2.8 V. Along with rising of the input voltage Vin, the control circuit 11 is activated. Just after the control circuit 11 is activated, the output voltage Vout and the feedback voltage Vfb are 0 V, and hence the amplifier 12 sets the control voltage Vcnt at the lowest voltage that the amplifier 12 can output. Thus, the output transistor M1 becomes full on state.

When the output transistor M1 is on state including full on state, charging current based on the input voltage Vin is supplied to the capacitor $C_F$ through the output transistor M1 and the inserted resistor R3. When the input voltage Vin is 4.0 V, in the process during which the output voltage Vout is rising from 0 V to the target voltage Vtg, a voltage drop at the inserted resistor R3 becomes a threshold voltage Vth[M3] of the charging transistor M3 (e.g. 0.7 V) or larger, and the charging transistor M3 becomes on state. Therefore, the charging current is supplied to the capacitor $C_F$ not through the resistor $R_F$ but through the charging transistor M3. A period between timing t1 and timing t2 in FIG. 18 is a period during which the charging transistor M3 is on state due to the voltage drop at the inserted resistor R3, and in this period the charging current is supplied to the capacitor $C_F$ through the charging transistor M3 instead of the resistor $R_F$.

When the output voltage Vout reaches the target voltage Vtg at timing t2, the amplifier 12 changes the control voltage Vcnt in an increasing direction on the basis of the feedback voltage Vfb. As a result, the charging transistor M3 switches from on state to off state due to a decrease in the voltage drop at the inserted resistor R3. After that, when stored charge in the capacitor $C_F$ decreases so that the output voltage Vout decreases from the target voltage Vtg, charging current is supplied to the capacitor $C_F$ through the resistor $R_F$. In FIG. 18, as an example, it is assumed that a load (not shown) connected to the node ND2 continuously draws very little current from the stored charge in the capacitor $C_F$.

It is described above that the charging transistor M3 switches from on state to off state when the output voltage Vout reaches the target voltage Vtg. However, depending on characteristics of the amplifier 12 or the input voltage Vin or other factor, the charging transistor M3 may switch to off state before the output voltage Vout reaches the target voltage Vtg (2.8 V in this example). For instance, if the input voltage Vin after timing t1 is 3.0 V, supposing that the threshold voltage Vth[M3] of the charging transistor M3 is 0.7 V, the charging transistor M3 switches to off state around time when the output voltage Vout reaches approximately 2.3 V. After that, the charging current to the capacitor $C_F$ is supplied through the resistor $R_F$.

In this way, in the power supply circuit 10B, the charging transistor M3, whose state (on/off state) is controlled on the basis of the voltage drop at the inserted resistor R3, is disposed between the nodes ND1 and ND2. Further, when a voltage at the drain of the output transistor M1 with respect to a potential at the node ND2 is higher than or equal to the threshold voltage Vth[M3] of the charging transistor M3, the charging transistor M3 is on state so that the capacitor $C_F$ is charged through the charging transistor M3.

In FIG. 18, for convenience of description, it is supposed that the input voltage Vin rises rapidly from 0 V to 4 V at timing 11. However, even if the input voltage Vin gently rises as shown in FIG. 14, the charging current is supplied to the capacitor $C_F$ through the charging transistor M3 during the period in which the voltage drop at the inserted resistor R3 is the threshold voltage Vth[M3] or larger.

According to Example EX1_2, when the power supply circuit 10B is activated, the capacitor $C_F$ is charged through the charging transistor M3 instead of the resistor $R_F$, and hence the output voltage Vout rises rapidly. Further, after the output voltage Vout reaches the target voltage Vtg, or after the output voltage Vout reaches near the target voltage Vtg, the charging transistor M3 is off state so that the filter circuit FIL including the resistor $R_F$ functions effectively. Therefore, the start speed can be increased while good ripple rejection characteristic with the filter circuit FIL is maintained.

Figure 19:
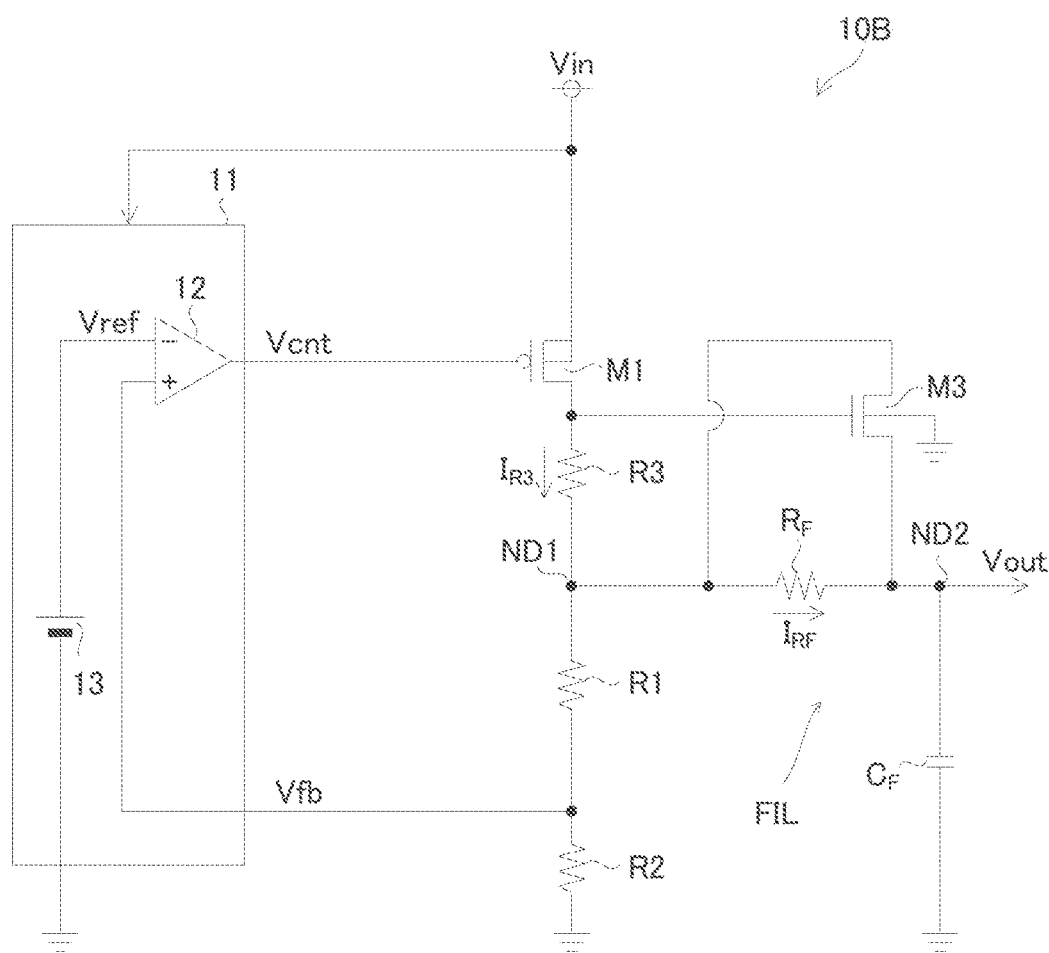
FIG. 19 is a circuit diagram of a variation of the power supply circuit according to Example EX1_2 of the eighth embodiment of the present invention.

Note that a backgate of the charging transistor M3 is connected to a source thereof in FIG. 17. However, as illustrated in FIG. 19, the backgate of the charging transistor M3 may be connected to the ground instead of the source thereof. In this way, on the basis of a substrate bias effect, the threshold voltage Vth[M3] of the charging transistor M3 can be increased. In addition, a parasitic diode is not formed in the charging transistor M3, and hence occurrence of reverse current from the node ND2 to the node ND1 can be prevented.

Example EX1_3

Figure 20:
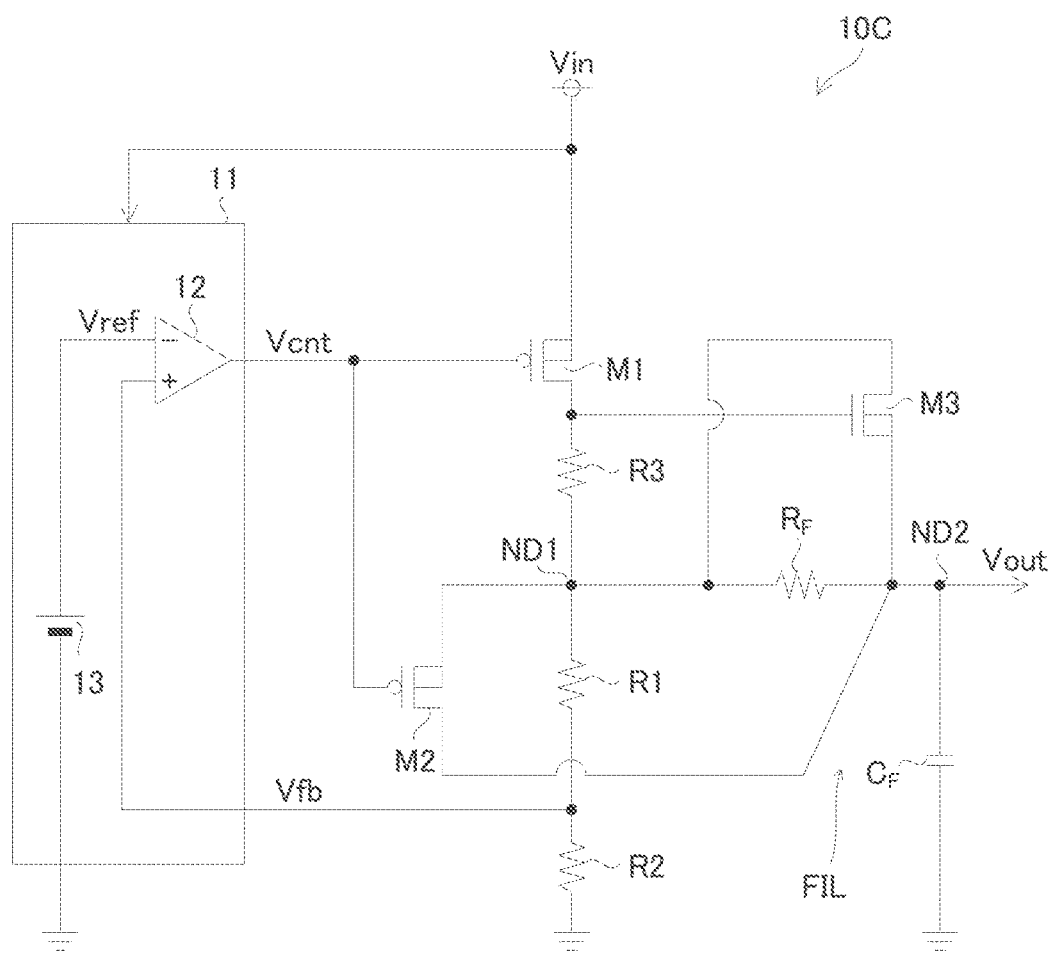
FIG. 20 is a circuit diagram of the power supply circuit according to Example EX1_3 of the eighth embodiment of the present invention.

Example EX1_3 is described. FIG. 20 is a circuit diagram of a power supply circuit 10C according to Example EX1_3. The power supply circuit 10C of FIG. 20 is one example of the power supply circuit 10. The power supply circuit 10C has a structure in which the structures of Examples EX1_1 and EX1_2 are combined. In other words, the power supply circuit 10C of FIG. 20 has a structure in which the charging transistors M2 and M3 and the inserted resistor R3 are added to the power supply circuit 10 of FIG. 12. Except this addition, the power supply circuit 10C of FIG. 20 is the same as the power supply circuit 10 of FIG. 12.

A connection relationship of the charging transistor M2 and other circuit elements, and a structure and an operation of the charging transistor M2 are the same as described above in Example EX1_1. A connection relationship of the charging transistor M3, the inserted resistor R3, and other circuit elements, and a structure and an operation of the charging transistor M3 are the same as described above in Example EX1_2. According to Example EX1_3, the same actions and effects as described in Examples EX1_1 and EX1_2 can be achieved.

Ninth Embodiment

A ninth embodiment of the present invention is described below. The ninth embodiment is based on the eighth embodiment. Unless otherwise noted and unless any contradiction occurs, description in the eighth embodiment is also applied to the ninth embodiment. In interpretation of the ninth embodiment, if there is a description incompatible with the eighth embodiment, description in the ninth embodiment should be given higher priority.

The ninth embodiment includes Examples EX2_1 to EX2_4 given below. Unless any contradiction occurs, description in any one of Examples EX2_1 to EX2_4 can be applied to other Example (i.e., any two or more Examples can be combined).

Example EX2_1

Example EX2_1 is described. A power supply device can be configured to include the power supply circuit 10 described in the eighth embodiment, and the power supply circuit 10 can be used as an internal power supply or a reference voltage source in the power supply device.

Figure 21:
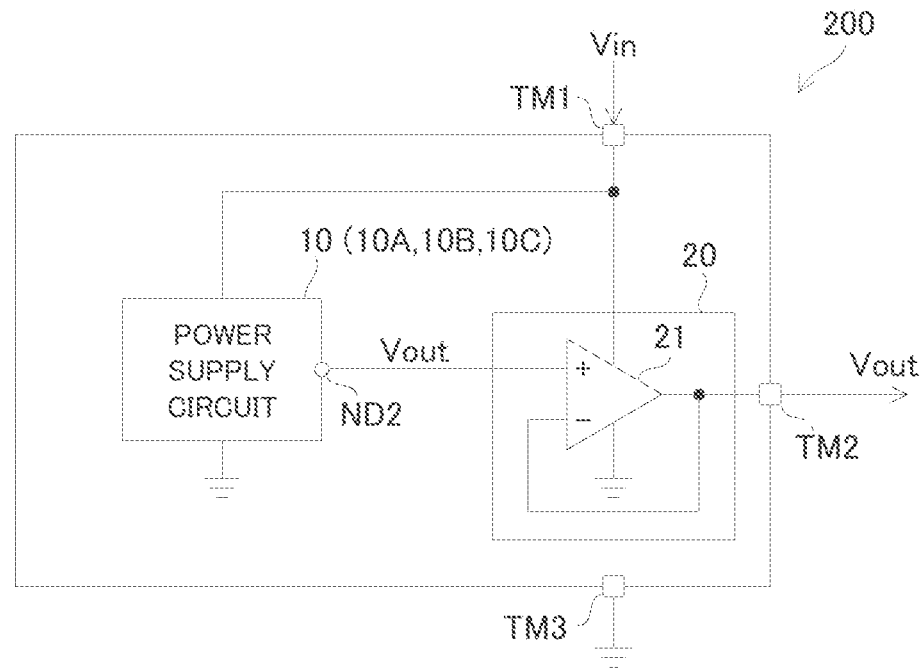
FIG. 21 is a structural diagram of the power supply device according to Example EX2_1 of a ninth embodiment of the present invention.

FIG. 21 illustrates a structure of a power supply device 200 according to Example EX2_1. The power supply device 200 includes an input terminal TM1, an output terminal TM2, a ground terminal TM3, the power supply circuit 10, and an output circuit 20. As the power supply circuit 10 in the power supply device 200, it is possible to use any one of the power supply circuits 10A, 10B, and 10C described in the eighth embodiment. The input voltage Vin described above is applied to the input terminal TM1. The ground terminal TM3 is connected to the ground. An output voltage $V_{OUT}$ of the power supply device 200 is applied to the output terminal TM2.

The output circuit 20 is constituted of an amplifier 21 that is an operational amplifier, and generates a final output voltage $V_{OUT}$ on the basis of the output voltage Vout of the power supply circuit 10. In the amplifier 21, a positive side power supply voltage is the input voltage Vin, and a negative side power supply voltage is 0 V. In the output circuit 20, the amplifier 21 is used as a voltage follower, and a voltage obtained by impedance conversion of the output voltage Vout of the power supply circuit 10 is output as the output voltage $V_{OUT}$ from the output terminal TM2. In other words, a noninverting input terminal of the amplifier 21 is connected to the node ND2 (see FIG. 15 and other drawings appropriately), and an inverting input terminal and an output terminal of the amplifier 21 are commonly connected to the output terminal TM2. In this way, the output voltage $V_{OUT}$ having the same voltage value as the output voltage Vout is output from the output terminal TM2 with low impedance.

Example EX2_2

Example EX2_2 is described. The output voltage Vout of the power supply circuit 10 (10A, 10B, or 10C) described above can be supplied to an arbitrary load device, and the output voltage $V_{OUT}$ of the power supply device 200 described above can be supplied to an arbitrary load device. In the following description, it is supposed that the output voltage $V_{OUT}$ of the power supply device 200 is supplied to an arbitrary load device.

It may be possible to constitute arbitrary electric equipment including the power supply device 200 and a load device. The load device works on the basis of the output voltage $V_{OUT}$ of the power supply device 200. The electric equipment may be equipment mounted in a vehicle such as an automobile (i.e. in-vehicle equipment), or may be industrial equipment, business equipment, home appliances, portable equipment including an information terminal, or the like.

Figure 22:
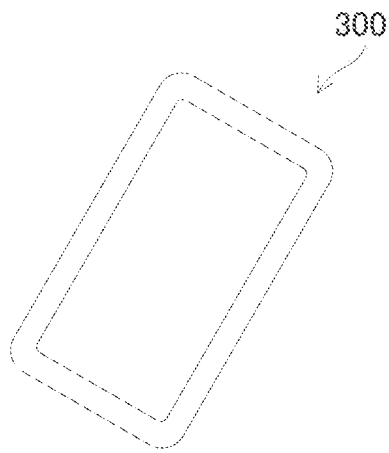
FIG. 22 is a schematic external view of a smartphone according to Example EX2_2 of the ninth embodiment of the present invention.

FIG. 22 illustrates a schematic external view of a smartphone 300 as one example of the electric equipment including the power supply device 200 and the load device. The smartphone 300 is one type of a mobile phone and is one type of an information terminal. In the smartphone 300, the load device that works on the basis of the output voltage $V_{OUT}$ of the power supply device 200 may be an arbitrary load (such as a processor, a memory, an LCD driver, or a communication IC) driven by DC power.

Example EX2_3

Example EX2_3 is described. The power supply device 200 may be constituted as a power supply IC. In this case, the power supply IC as the power supply device 200 is an electronic component (semiconductor device) including a semiconductor chip in which a semiconductor integrated circuit constituting the power supply device 200 is formed, a casing (package) housing the semiconductor chip, and a plurality of external terminals attached to the casing and exposed from the casing, which is manufactured by sealing the semiconductor chip in the casing made of resin. The terminals TM1 to TM3 in FIG. 21 are included in the plurality of external terminals.

Example EX2_4

Example EX2_4 is described. Within the scope of above description without spoiling the spirit thereof, the transistors may be any type of transistors. For instance, without spoiling the above spirit, it may be possible to modify to replace a P-channel type MOSFET with an N-channel type MOSFET, or to replace an N-channel type MOSFET with a P-channel type MOSFET, or to replace a P-channel type MOSFET with a PNP type bipolar transistor and to replace an N-channel type MOSFET with an NPN type bipolar transistor. Further, it may be possible to modify to replace an MOSFET with a junction type FET or an IGBT.

An arbitrary transistor has a first electrode, a second electrode and a control electrode. In an FET, one of the first and second electrodes is a drain and the other is a source, and the control electrode is a gate. In an IGBT, one of the first and second electrodes is a collector and the other is an emitter, and the control electrode is a gate. In a bipolar transistor other than the IGBT, one of the first and second electrodes is a collector and the other is an emitter, and the control electrode is a base.

Further, the embodiments of the present invention can be appropriately and variously modified within the scope of the technical idea described in the claims. The embodiments described above are merely examples of the embodiments of the present invention, and meanings of the terms of the present invention and the elements are not limited to those described in the embodiments. Specific numeric values shown in the above description are merely examples and can be modified variously as a matter of course.

SUMMARY

In the following description, the various embodiments disclosed in this specification are described in a comprehensive manner.

For instance, a power supply circuit disclosed in this specification includes an output circuit arranged to generate a stabilized voltage from an input voltage using an output transistor, a filter circuit arranged to smooth the stabilized voltage using a resistor and a capacitor so as to generate an output voltage, and a charging circuit arranged to supply charging current to the capacitor without the charging current being passed through the resistor (first structure).

Note that, in the power supply circuit having the first structure, the charging circuit preferably includes a charging comparator arranged to compare the stabilized voltage with the output voltage so as to generate a charging control signal, and a charging switch arranged to turn on and off the charging current in accordance with the charging control signal (second structure).

Further, in the power supply circuit having the first or second structure, the charging circuit preferably includes a P-channel type metal-oxide-semiconductor field effect transistor (PMOSFET) having a source connected to an application terminal of the stabilized voltage, a drain connected to an application terminal of the output voltage, and a gate connected to a gate of the output transistor (third structure).

Further, in the power supply circuit having any one of the first to third structures, the charging circuit preferably includes a depression type N-channel type MOSFET (NMOSFET) having a drain connected to an application terminal of the stabilized voltage, a source connected to an application terminal of the output voltage, and a gate connected to an application terminal of a predetermined bias voltage (fourth structure).

Further, in the power supply circuit having any one of the first to fourth structures, the charging circuit preferably includes a diode having an anode connected to an application terminal of the stabilized voltage, and a cathode connected to an application terminal of the output voltage (fifth structure).

Further, the power supply circuit having any one of the first to fifth structures preferably further includes a discharge circuit arranged to draw a discharge current from the capacitor without the discharge current being passed through the resistor when the output voltage is higher than an overcharge detection threshold value (sixth structure).

Further, in the power supply circuit having the sixth structure, the discharge circuit preferably includes a current mirror type comparator arranged to compare the stabilized voltage with the output voltage so as to generate the discharge current (seventh structure).

Further, in the power supply circuit having the sixth structure, the discharge circuit may include a discharge comparator arranged to compare the stabilized voltage with the output voltage so as to generate a discharge control signal, and a discharge switch arranged to turn on and off the discharge current in accordance with the discharge control signal (eighth structure).

Further, a power supply device disclosed in this specification includes the power supply circuit having any one of the first to eighth structures, as an internal power supply circuit arranged to generate an internal reference voltage or an internal power supply voltage (ninth structure).

Further, a vehicle disclosed in this specification includes the power supply device having the ninth structure, and a load supplied with power from the power supply device (tenth structure).

Further, for example, a power supply circuit disclosed in this specification is a power supply circuit that generates a stabilized voltage from an input voltage. The power supply circuit includes an output transistor having a first electrode receiving the input voltage, a second electrode, and a control electrode; a first node connected directly or via an inserted resistor to the second electrode of the output transistor; a control circuit arranged to supply a control voltage based on a feedback voltage corresponding to a voltage at the first node to the control electrode of the output transistor so as to control a state of the output transistor; a filter circuit having a filter resistor and a filter capacitor, arranged to smooth the voltage at the first node so as to generate the stabilized voltage at a second node; and a charging transistor disposed between the first node and the second node, a state of the charging transistor being controlled on the basis of a voltage drop at the inserted resistor. When the charging transistor is on state, the filter capacitor is charged through the charging transistor (eleventh structure).

The power supply circuit having the eleventh structure may be configured as follows. The power supply circuit is a linear regulator arranged to control the output transistor so that the stabilized voltage matches a predetermined target voltage. In a predetermined first state where the input voltage is lower than the target voltage, the control circuit generates a voltage for allowing both the output transistor and the charging transistor to be on state as the control voltage, on the basis of the feedback voltage. In a predetermined second state where the input voltage is higher than the target voltage, the control circuit generates a voltage for allowing the output transistor to be on state and allowing the charging transistor to be off state as the control voltage, on the basis of the feedback voltage (twelfth structure).

The power supply circuit having the eleventh or twelfth structure may be configured as follows. The output transistor and the charging transistor are constituted as P-channel type MOSFETs. A first electrode, a second electrode, and a control electrode of the output transistor are respectively a source, a drain, and a gate of the output transistor. A source and a drain of the charging transistor are connected to the first node and the second node, respectively. The control voltage is applied commonly to gates of the output transistor and the charging transistor (thirteenth structure).

The power supply circuit having any one of the eleventh to thirteenth structures may be configured as follows. The first node is connected to the second electrode of the output transistor via the inserted resistor. The power supply circuit further includes a second charging transistor disposed between the first node and the second node, a state of the second charging transistor being controlled on the basis of a voltage drop at the inserted resistor (fourteenth structure).

The power supply circuit having the fourteenth structure may be configured as follows. When a voltage at the second electrode of the output transistor with respect to a potential at the second node is higher than or equal to a threshold voltage of the second charging transistor, the second charging transistor is on state so that the filter capacitor is charged through the second charging transistor (fifteenth structure).

The power supply circuit having the fourteenth or fifteenth structure may be configured as follows. The second charging transistor is constituted as an N-channel type MOSFET, a drain and a source of the second charging transistor are connected to the first node and the second node, respectively, and a gate of the second charging transistor is connected to a second electrode of the output transistor (sixteenth structure).

The power supply circuit having any one of the eleventh to sixteen structures may be configured as follows. The filter resistor is disposed between the first node and the second node, and the filter resistor and the filter capacitor are connected to each other at the second node (seventeenth structure).

Further, for example, a power supply circuit disclosed in this specification, which is a power supply circuit that generates a stabilized voltage from an input voltage, may be configured as follows. The power supply circuit includes an output transistor having a first electrode receiving the input voltage, a second electrode, and a control electrode; a first node connected to the second electrode of the output transistor via an inserted resistor; a control circuit arranged to supply a control voltage based on a feedback voltage corresponding to a voltage at the first node to the control electrode of the output transistor so as to control a state of the output transistor; a filter circuit having a filter resistor and a filter capacitor, arranged to smooth the voltage at the first node so as to generate the stabilized voltage at a second node; and a charging transistor disposed between the first node and the second node, a state of the charging transistor being controlled on the basis of a voltage drop at the inserted resistor. When the charging transistor is on state, the filter capacitor is charged through the charging transistor (eighteenth structure).

The power supply circuit having the eighteenth structure may be configured as follows. When a voltage at the second electrode of the output transistor with respect to a potential at the second node is higher than or equal to a threshold voltage of the charging transistor, the charging transistor is on state so that the filter capacitor is charged through the charging transistor (nineteenth structure).

The power supply circuit having the eighteenth or nineteenth structure may be configured as follows. The charging transistor is configured as an N-channel type MOSFET, a drain and a source of the charging transistor are connected to the first node and the second node, respectively, and a gate of the charging transistor is connected to a second electrode of the output transistor (twelfth structure).

The power supply circuit having any one of the eighteenth to twelfth structures may be configured as follows. The filter resistor is disposed between the first node and the second node, and the filter resistor and the filter capacitor are connected to each other at the second node (twenty-first structure).

Further, a power supply device disclosed in this specification includes the power supply circuit having any one of the eleventh to twenty-first structures, and an output circuit arranged to receive with voltage follower the stabilized voltage generated by the power supply circuit so as to generate an output voltage (twenty-second structure).

Other Variations

Note that, other than the embodiments described above, various technical features disclosed in this specification can be variously modified within the scope of the technical invention without deviating from the spirit thereof. For instance, mutual replacement between a bipolar transistor and a MOS field effect transistor, and inversion of logic levels of various signals can be arbitrarily performed. In other words, the embodiments described above are merely examples in every aspect and should not be interpreted as limitations. The technical scope of the present invention is not limited to the embodiments described above and should be understood to include all modifications within the meaning and scope equivalent to the claims.

INDUSTRIAL APPLICABILITY

The invention disclosed in this specification can be used for power supply circuits mounted in various applications (such as in-vehicle equipment, industrial equipment, business equipment, digital home appliances, and portable equipment).

What is claimed is:
1. A power supply circuit comprising:
an output circuit arranged to generate a stabilized voltage from an input voltage using an output transistor;
a filter circuit arranged to smooth the stabilized voltage using a resistor and a capacitor so as to generate an output voltage; and a charging circuit arranged to supply charging current to the capacitor without the charging current being passed through the resistor, wherein
the charging circuit includes a charging comparator arranged to compare the stabilized voltage with the output voltage so as to generate a charging control signal, and a charging switch arranged to turn on and off the charging current in accordance with the charging control signal.

2. The power supply circuit according to claim 1, wherein the charging circuit includes a PMOSFET having a source connected to an application terminal of the stabilized voltage, a drain connected to an application terminal of the output voltage, and a gate connected to a gate of the output transistor.

3. The power supply circuit according to claim 1, wherein the charging circuit includes a depletion type NMOSFET having a drain connected to an application terminal of the stabilized voltage, a source connected to an application terminal of the output voltage, and a gate connected to an application terminal of a predetermined bias voltage.

4. The power supply circuit according to claim 1, wherein the charging circuit includes a diode having an anode connected to an application terminal of the stabilized voltage, and a cathode connected to an application terminal of the output voltage.

5. The power supply circuit according to claim 1, further comprising a discharge circuit arranged to draw a discharge current from the capacitor without the discharge current being passed through the resistor when the output voltage is higher than an overcharge detection threshold value.

6. The power supply circuit according to claim 5, wherein the discharge circuit includes a current mirror type comparator arranged to compare the stabilized voltage with the output voltage so as to generate the discharge current.

7. The power supply circuit according to claim 5, wherein the discharge circuit includes a discharge comparator arranged to compare the stabilized voltage with the output voltage so as to generate a discharge control signal, and a discharge switch arranged to turn on and off the discharge current in accordance with the discharge control signal.

8. A power supply device comprising an internal power supply circuit arranged to generate an internal reference voltage or an internal power supply voltage, wherein the internal power supply circuit is the power supply circuit according to claim 1.

9. A vehicle comprising:
the power supply device according to claim 8; and
a load supplied with power from the power supply device.

10. A power supply circuit arranged to generate a stabilized voltage from an input voltage, the power supply circuit comprising:
an output transistor having a first electrode receiving the input voltage, a second electrode, and a control electrode;
a first node connected to the second electrode of the output transistor directly or via an inserted resistor;
a control circuit arranged to supply a control voltage based on a feedback voltage corresponding to a voltage at the first node to the control electrode of the output transistor so as to control a state of the output transistor;
a filter circuit having a filter resistor and a filter capacitor, arranged to smooth the voltage at the first node so as to generate the stabilized voltage at a second node; and
a charging transistor disposed between the first node and the second node, a state of the charging transistor being controlled on the basis of the control voltage, wherein when the charging transistor is in an on state, the filter capacitor is charged through the charging transistor.

11. The power supply circuit according to claim 10, wherein
the power supply circuit is a linear regulator arranged to control the output transistor so that the stabilized voltage matches a predetermined target voltage,
in a predetermined first state where the input voltage is lower than the target voltage, the control circuit generates a voltage as the control voltage for allowing both the output transistor and the charging transistor to be in a respective on state, on the basis of the feedback voltage, and
in a predetermined second state where the input voltage is higher than the target voltage, the control circuit generates a voltage for allowing the output transistor to be in the respective on state and allowing the charging transistor to be in an off state as the control voltage, on the basis of the feedback voltage.

12. The power supply circuit according to claim 10, wherein
the output transistor and the charging transistor are constituted as P-channel type MOSFETs,
the first electrode, the second electrode, and the control electrode of the output transistor are respectively a source, a drain, and a gate of the output transistor,
a source and a drain of the charging transistor are connected to the first node and the second node, respectively, and
the control voltage is applied commonly to gates of the output transistor and the charging transistor.

13. The power supply circuit according to claim 10, wherein
the first node is connected to the second electrode of the output transistor via the inserted resistor, and
the power supply circuit further comprises a second charging transistor disposed between the first node and the second node, a state of the second charging transistor being controlled on the basis of a voltage drop across the inserted resistor.

14. The power supply circuit according to claim 13, wherein when a voltage at the second electrode of the output transistor with respect to a potential at the second node is higher than or equal to a threshold voltage of the second charging transistor, the second charging transistor is an on state so that the filter capacitor is charged through the second charging transistor.

15. The power supply circuit according to claim 13, wherein
the second charging transistor is constituted as an N-channel type MOSFET,
a drain and a source of the second charging transistor are connected to the first node and the second node, respectively, and
a gate of the second charging transistor is connected to a second electrode of the output transistor.

16. The power supply circuit according to claim 10, wherein the filter resistor is disposed between the first node and the second node, and the filter resistor and the filter capacitor are connected to each other at the second node.

17. A power supply device comprising:
the power supply circuit according to claim 10; and
an output circuit arranged to receive through a voltage follower the stabilized voltage generated by the power supply circuit so as to generate an output voltage.

18. A power supply circuit arranged to generate a stabilized voltage from an input voltage, the power supply circuit comprising:
- an output transistor having a first electrode receiving the input voltage, a second electrode, and a control electrode;
- a first node connected to the second electrode of the output transistor via an inserted resistor;
- a control circuit arranged to supply a control voltage based on a feedback voltage corresponding to a voltage at the first node to the control electrode of the output transistor so as to control a state of the output transistor;
- a filter circuit having a filter resistor and a filter capacitor, arranged to smooth the voltage at the first node so as to generate the stabilized voltage at a second node; and
- a charging transistor disposed between the first node and the second node, a state of the charging transistor being controlled on the basis of a voltage drop across the inserted resistor, wherein
- when the charging transistor is in an on state, the filter capacitor is charged through the charging transistor.

19. The power supply circuit according to claim 18, wherein when a voltage at the second electrode of the output transistor with respect to a potential at the second node is higher than or equal to a threshold voltage of the charging transistor, the charging transistor is in the on state so that the filter capacitor is charged through the charging transistor.

20. The power supply circuit according to claim 18, wherein
- the charging transistor is configured as an N-channel type MOSFET,
- a drain and a source of the charging transistor are connected to the first node and the second node, respectively, and
- a gate of the charging transistor is connected to a second electrode of the output transistor.

21. The power supply circuit according to claim 18, wherein the filter resistor is disposed between the first node and the second node, and the filter resistor and the filter capacitor are connected to each other at the second node.

* * * * *